(12) United States Patent
Manico et al.

(10) Patent No.: US 8,139,126 B2
(45) Date of Patent: Mar. 20, 2012

(54) DIGITAL VIDEO SYSTEM FOR ASSEMBLING VIDEO SEQUENCES

(75) Inventors: Joseph A. Manico, Rochester, NY (US); John R. Fredlund, Rochester, NY (US); Kenneth A. Parulski, Rochester, NY (US); Michael J. Telek, Pittsford, NY (US); John R. McCoy, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 12/908,926

(22) Filed: Oct. 21, 2010

(65) Prior Publication Data

US 2011/0032388 A1    Feb. 10, 2011

Related U.S. Application Data

(63) Continuation of application No. 10/804,946, filed on Mar. 19, 2004, now abandoned.

(51) Int. Cl.
*H04N 5/262* (2006.01)
*H04N 5/225* (2006.01)

(52) U.S. Cl. ......................... 348/239; 348/376
(58) Field of Classification Search ................ 348/239, 348/373–376, 578
See application file for complete search history.

(56) References Cited

U.S. PATENT DOCUMENTS

| | | | |
|---|---|---|---|
| 4,688,105 A | 8/1987 | Bloch et al. | |
| 5,477,264 A | 12/1995 | Sarbadhikari et al. | |
| 5,914,748 A | 6/1999 | Parulski et al. | |
| 6,005,972 A | 12/1999 | Fredlund et al. | |
| 6,072,933 A | 6/2000 | Green | |
| 6,085,195 A | 7/2000 | Hoyt et al. | |
| 6,292,219 B1 | 9/2001 | Fredlund et al. | |
| 6,369,908 B1 | 4/2002 | Frey et al. | |
| 6,556,243 B1 | 4/2003 | Dotsubo et al. | |
| 6,587,119 B1 * | 7/2003 | Anderson et al. | 345/672 |
| 7,024,054 B2 | 4/2006 | Cahill et al. | |
| 7,375,769 B2 | 5/2008 | Yui | |
| 7,391,444 B1 | 6/2008 | Nomura et al. | |

(Continued)

FOREIGN PATENT DOCUMENTS

JP    2000-048543    2/2000

(Continued)

OTHER PUBLICATIONS iMovie: Introduction to Digital Video Editing by Academic Computing Services, A Division of Information Services, at the University of Kanasa; published 2003.

*Primary Examiner* — Daniel M Pasiewicz
(74) *Attorney, Agent, or Firm* — Raymond L. Owens

(57) ABSTRACT

An image processing system (10) obtains image sequences and assembles a presentation therefrom. The system has a camera (12) for capturing image sequences, a random-access electronic memory (16) for temporary storage of the image sequences, an input reader for accepting pre-programmed instructions from a first storage medium, a control panel with a display (18) for viewing image sequences (64) and presenting pre-programmed instructions to the operator and an operator interface for accepting responses to the pre-programmed instructions. A control logic processor (20) executes pre-programmed instructions and arranges the presentation from the captured image sequences stored in random-access electronic memory (16), according to operator responses. An output writer records the presentation onto a storage medium.

15 Claims, 21 Drawing Sheets

U.S. PATENT DOCUMENTS

| | | |
|---|---|---|
| 7,519,236 B2 | 4/2009 | Cheng et al. |
| 7,580,068 B2 | 8/2009 | Silverbrook |
| 2001/0033732 A1 | 10/2001 | Juen et al. |
| 2002/0007718 A1 | 1/2002 | Corset |
| 2002/0030744 A1 | 3/2002 | Sawachi |
| 2002/0110354 A1 | 8/2002 | Ikeda et al. |
| 2002/0136294 A1 | 9/2002 | Culbert |
| 2003/0169350 A1 | 9/2003 | Wiezel et al. |
| 2004/0004665 A1 | 1/2004 | Kashiwa |
| 2004/0095474 A1 | 5/2004 | Matsufune |

FOREIGN PATENT DOCUMENTS

| | | |
|---|---|---|
| JP | 2001-285784 | 10/2001 |
| JP | 2004-032277 | 1/2004 |

* cited by examiner

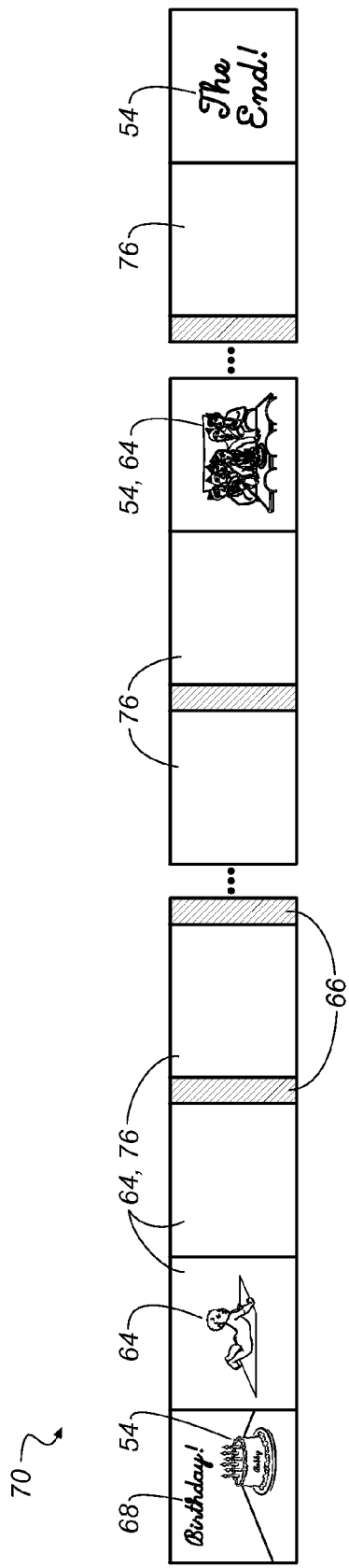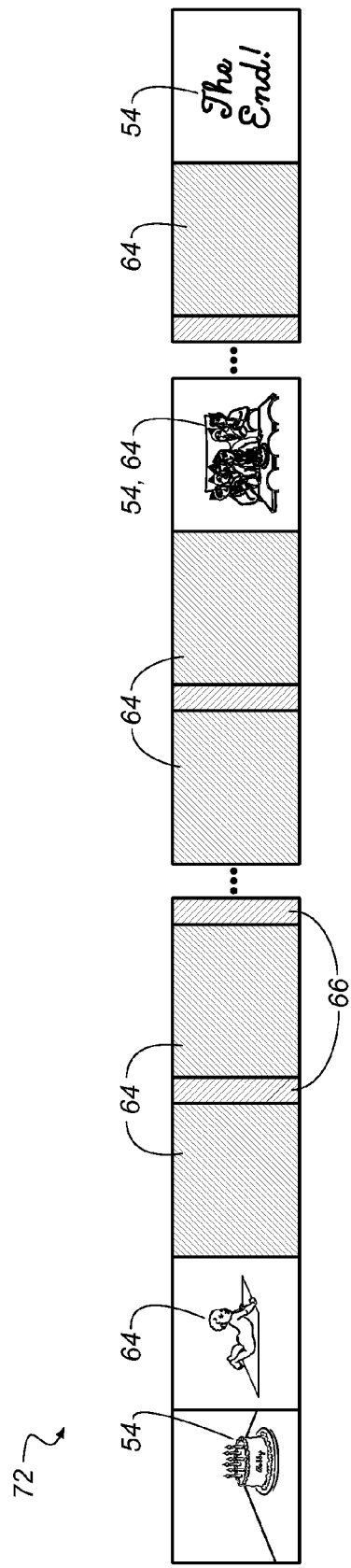

DIGITAL VIDEO SYSTEM FOR ASSEMBLING VIDEO SEQUENCES

CROSS REFERENCE TO RELATED APPLICATION

This application is a continuation of U.S. Ser. No. 10/804,946 filed Mar. 19, 2004 now abandoned (U.S. Patent Application Publication No. 2005/0206751), entitled "Digital Video System for Assembling Video Sequences" by Joseph A. Manico et al, the disclosure of which is incorporated herein.

FIELD OF THE INVENTION

The present invention relates to the capture and display of motion images and more particularly relates to an apparatus and method for producing more compelling video programs by a consumer.

BACKGROUND OF THE INVENTION

In the consumer market, steadily improving image quality, increased affordability, and ease of use have contributed to the rapid acceptance and use of video camcorders. Digital video capture and display devices have further benefited from advances in storage technologies using magnetic, optical, and electronic storage media such as digital videotape, memory cards, optical disks, and high-capacity random access memory (RAM) components. However, while camcorders have grown in popularity, many consumers express some level of disappointment with the image output achieved. For many reasons, the output from consumer camcorders can be disappointing or uninteresting to the viewer when compared with output captured and edited by imaging professionals. The problem is not typically caused by failure to use the equipment properly, but by a basic lack of a script, or a story, which is compelling to the viewer. Post-production modification and editing of video sequences is possible, but is inconvenient, and difficult to use for most consumers.

Efforts have been made to address this problem by providers of digital image capture equipment and accessories. For example, commonly-assigned U.S. Pat. No. 5,477,264 (Sarbadhikari et al.) discloses, for an electronic camera, a removable storage device preloaded with enhancement files for effecting camera operation, with additional graphical overlays and borders, and with built-in optimization, compression, and image enhancement algorithms. Commonly-assigned U.S. Pat. No. 6,292,219 (Fredlund et al.) discloses an electronic motion picture camera system that provides special-effect video output. The device of U.S. Pat. No. 6,292,219 provides a removable motion image-recording medium with programs that automatically, or as instructed by the camera operator, act upon a captured video stream to provide an edited appearance, instructing the camera to affect imaging characteristics such as focus, highlighting effects, segues, fade-outs, and other effects.

One technological advance of particular importance for imaging enhancement, and capitalized upon by the methods and apparatus of U.S. Pat. No. 6,292,219 relates to the use of high-capacity random access storage device, such as an optical disc. Use of a random access storage device, as contrasted with accessing a continuous video stream stored on a cassette tape, provides the ability to insert pre-stored image sequences and effects at suitable points in the captured image sequence in order to display a pleasing motion picture presentation without abrupt scene changes. In place of an optical disc, Flash EPROM memory can be used instead. An example of an image capture apparatus incorporating a high-capacity Flash EPROM is the SD Multi A/V Recorder, a camcorder from Panasonic, with U.S. headquarters in Secaucus, N.J.

While the solutions disclosed in both the U.S. Pat. Nos. 5,477,264 and 6,292,219 provide, for example, the ability to improve the transitions between scenes, there remains significant room for improvement in making the captured scenes themselves interesting. For example, while these methods allow the use of pre-programmed transitions, borders, and special effects, the consumer must make appropriate decisions in order to use these enhancements effectively. Further, solutions offered in these patents are not intended to provide the benefits afforded by professional editing techniques, such as scripting and composition used by cinematographers, who seldom shoot a motion picture sequence in the studio according to the timeline sequence of a motion picture. In motion picture studios, as is well known, scenes are shot according to a schedule that is best suited for production and are later assembled at an editing facility, according to a scripted storyboard. It can be appreciated that there would be advantages to providing some measure of storyboard capability to a consumer for event-based imaging with an edited appearance. The consumer would benefit from guidance in shooting appropriate scene content and would benefit from an ability to customize an image sequence, suited to the subject, audience, and event.

Certainly, a substantial amount of motion video capture by consumers is event-based. Birthdays, holidays, family gatherings, parties, graduations, wedding anniversaries, and the like are among the salient types of events that consumers wish to capture, retain, and display in a pleasing format. While the capabilities offered in U.S. Pat. Nos. 5,477,246 and 6,292,219 provide useful utilities and effects that can make electronic images from such events more pleasing, there remains a need for ways to help the consumer to capture images and image sequences that will display in a pleasing manner.

Furthermore, there is an interest in using motion video capture devices to portray family and friends in a compelling or humorous way as part of a video program. For example, incorporating motion images of family or friends within a music video or parody show would provide an amusing program.

Thus, there is a need to provide an electronic imaging system which includes instructions to enable a digital video system to obtain appropriate video sequences, and to automatically assemble the video sequences into a video program.

SUMMARY OF THE INVENTION

Briefly, according to one aspect of the present invention an image processing system for obtaining a plurality of image sequences and assembling a presentation from the plurality of image sequences comprises:
  (a) a camera for capturing the plurality of image sequences;
  (b) a random-access electronic memory for temporary storage of the plurality of image sequences;
  (c) an input reader for accepting pre-programmed instructions from a first storage medium;
  (d) a control panel comprising:
    (i) a display for viewing the image sequences and presenting pre-programmed instructions to the operator; and
    (ii) an operator interface for accepting operator responses to the pre-programmed instructions;
  (e) a control logic processor for executing the pre-programmed instructions and for arranging the presentation from the plurality of captured image sequences stored in the random-access electronic memory according to the operator responses; and (f) an output writer for recording the presentation onto a second storage medium.

According to another embodiment, the present invention provides a method for forming a presentation comprising a set of image sequences captured electronically, the method comprising:

(a) obtaining programmed instructions for capturing members of the set of image sequences;

(b) assembling an electronic storyboard, according to the programmed instructions, comprising a plan for the arrangement of the members of the set of image sequences;

(c) prompting the camera operator to obtain each member of the set of image sequences by displaying operator instructions to the camera operator;

(d) storing the set of image sequences in a memory;

(e) assembling the presentation using the set of image sequences, according to the electronic storyboard; and (f) recording the presentation onto a storage medium.

It is an object of the present invention to meet the needs for consumer capture of more pleasing images and image sequences electronically.

It is an advantage of the present invention that it provides guidance to the camera operator by means of visual and/or audible instructions for capturing image content appropriate to a theme or event.

It is a further advantage of the present invention that it frees the camera operator from editing or imaging sequence concerns, enabling the operator to have a more enjoyable experience in obtaining images electronically.

It is a further advantage of the present invention that it enables a novice camera operator to produce images and image sequences that have a more professional, edited appearance.

It is yet a further advantage of the present invention that it allows an operator to customize an event- or theme-based image sequence to be suited to a particular subject or audience.

These and other objects, features, and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

While the specification concludes with claims particularly pointing out and distinctly claiming the subject matter of the present invention, it is believed that the invention will be better understood from the following description when taken in conjunction with the accompanying drawings, wherein:

FIG. 9a is a block diagram showing an empty electronic storyboard, assembled according to the present invention;

FIG. 9b is a block diagram showing a completed electronic storyboard, populated using images obtained according to the present invention.

DETAILED DESCRIPTION OF THE INVENTION

The present description is directed in particular to elements forming part of, or cooperating more directly with, apparatus in accordance with the invention. It is to be understood that elements not specifically shown or described may take various forms well known to those skilled in the art.

Figure 1:
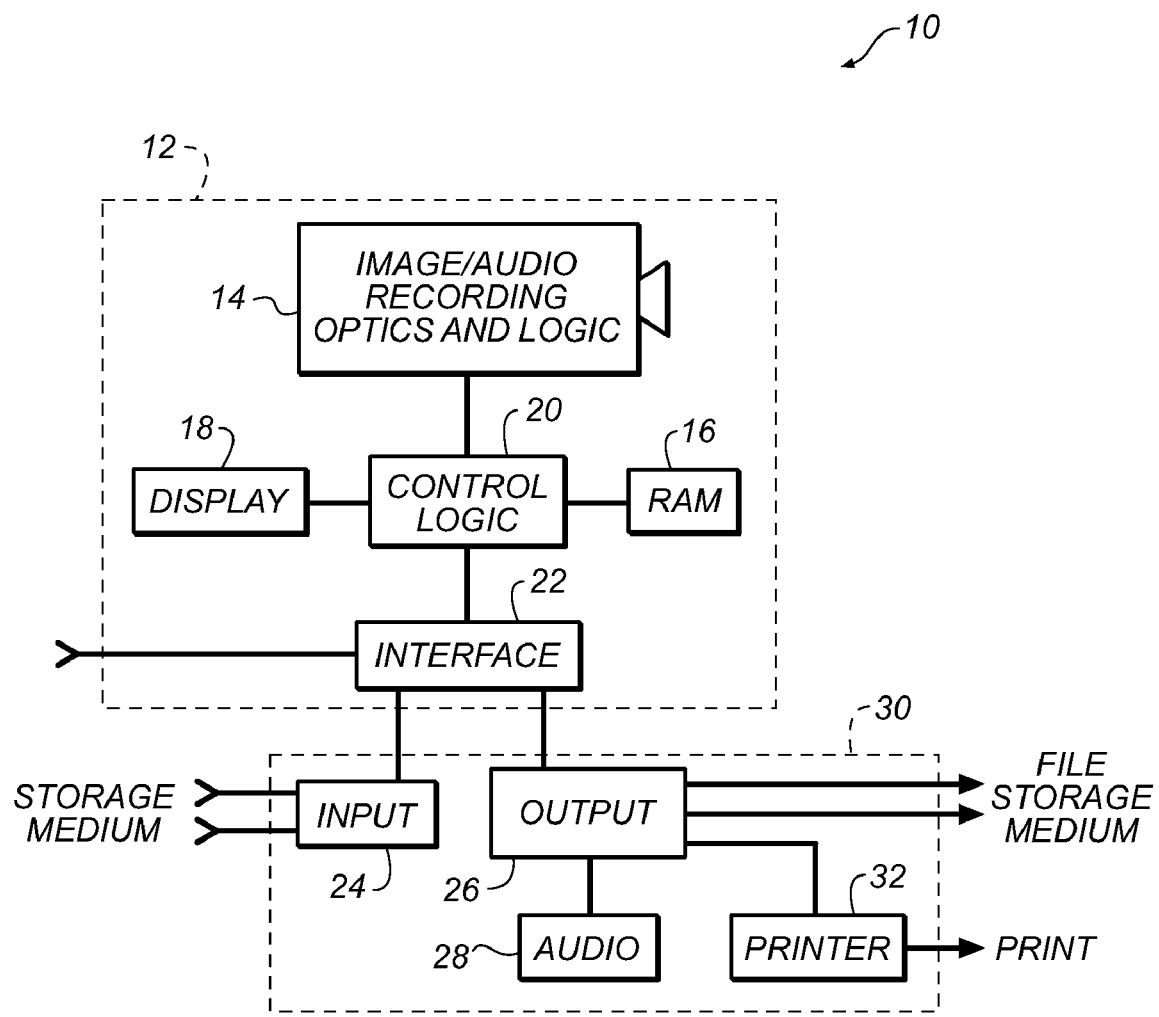
FIG. 1 is a schematic block diagram of an image capture and processing apparatus according to the present invention.

Referring to FIG. 1, there is shown a schematic block diagram of an imaging apparatus 10 used for obtaining and processing still or motion picture images according to one embodiment of the present invention. Imaging apparatus 10 has two major components, a camera 12 and an imaging dock assembly 30. Camera 12 consists of an image capture and recording apparatus 14 that includes imaging optics and electronic sensor circuitry, such as a conventional CCD, for example, for obtaining a two-dimensional electronic image. Image capture and recording apparatus 14 is supported by a RAM 16 and a display 18. A control logic processor 20 provides operational logic for operation of camera 12 and cooperates with an interface circuit 22 for communication with imaging dock assembly 30 and with external input devices.

Imaging dock assembly 30 has an input interface section 24 and an output interface section 26. Input interface section 24 accepts input software and data from any of a number of storage devices or input communication channels. Input data and software can be provided, for example, by magnetic or optical storage devices, such as floppy diskettes, memory cards, removable magnetic hard drives or optical media such as CDs and DVDs. Input can also be provided over wired or wireless ports, using any of a variety of networked or standalone communication mechanisms, such as Ethernet, IR, RF, or Bluetooth devices. Output interface section 26 may support audio input or playback circuitry 28, a printer 32, and a host of storage media. Image and/or audio output can be provided in the form of hard-copy output or in file form, using any number of wired or wireless communication and storage mechanisms.

It must be emphasized that imaging apparatus 10 as shown in FIG. 1 can have any of a number of alternative arrangements of components for camera 12 and its supporting imaging dock assembly 30. The basic components shown in FIG. 1 are needed, in some form, for operation of the method of the present invention. Using the overall arrangement shown in FIG. 1, imaging apparatus 10 is capable of accepting programmed instructions and of capturing, processing, and playing back image and audio content according to those instructions, in a manner particularly well suited for event-based or theme-based imaging.

Figure 2:
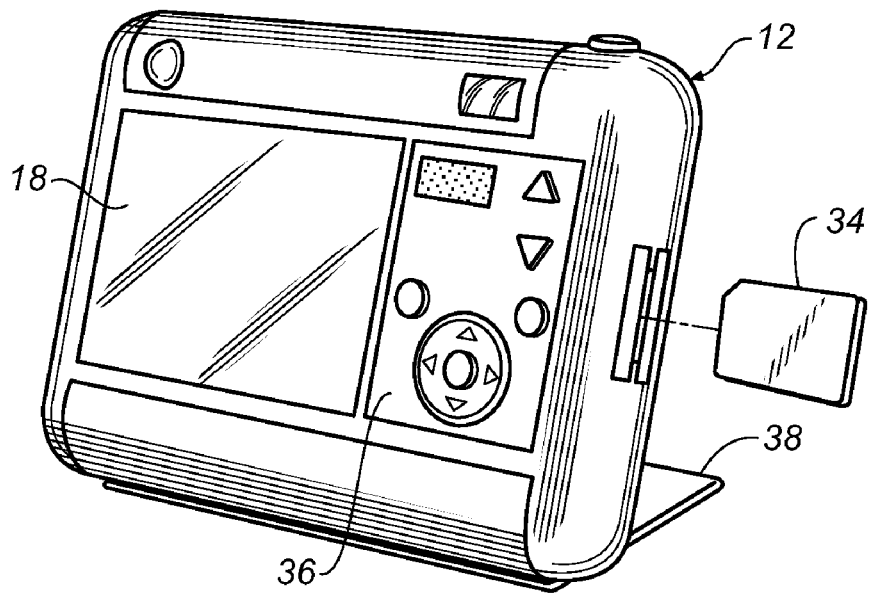
FIG. 2 is a perspective view of a camera used for image capture according to the method of the present invention.

Referring to FIG. 2, there is shown, in perspective view, one embodiment of camera 12 with a removable storage device 34 in the form of a memory card. An operator interface panel 36 is provided for control of camera 12 operation. Display 18 may be in the form of a touchscreen, enabling entry of additional operator instructions to camera 12. A stand 38 enables camera 12 to be seated on a surface for various image capture and playback functions.

Figure 3:
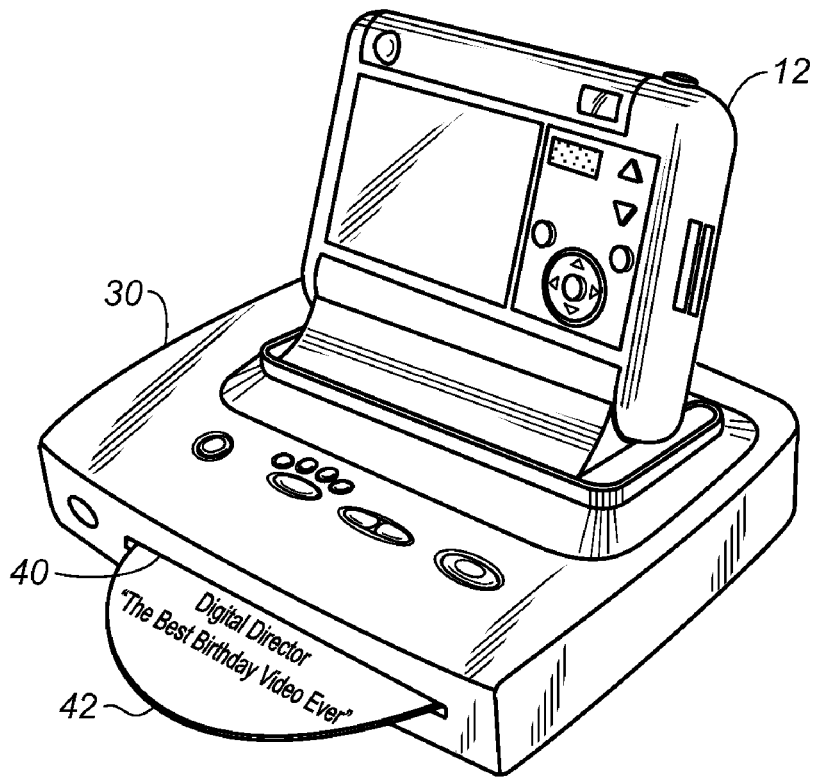
FIG. 3 is a perspective view of the camera of FIG. 2 in a supporting imaging dock assembly.

Referring to FIG. 3, camera 12 is shown in position with imaging dock assembly 30. A CD/DVD port 40 is provided as an input/output mechanism for receiving pre-programmed instructions as well as for receiving pre-stored audio and/or imaging content from an optical storage disk 42, such as a CD or DVD. In one embodiment, CD/DVD port 40 has read/write capability, allowing a captured image sequence, with optional audio content, to be written to a storage device for playback or archiving. Alternatively, other ports (not shown in FIG. 3) could be used for input and/or output to memory card or other storage devices.

When operating according to the present invention, imaging apparatus 10 functions as a digital director, providing operator guidance and automated image processing utilities that enable even an unskilled operator to capture and construct a presentation of image sequences that can have the appearance of a professionally prepared production. As can be readily appreciated, imaging apparatus 10 would be especially well-suited for developing an image presentation that is event-based or theme-based.

Obtaining Programmed Instructions and Images

In order to function as a digital director, imaging apparatus 10 must first obtain a set of programmed instructions that are suited to the particular theme or event of interest. Additionally, other images and special effects can also be provided for digital director operation. In one embodiment, programmed instructions and images are available on a DVD or similar optically encoded medium. Various versions of digital director media could be made available to consumers, differentiated by theme or event. Typical activities for which digital director media could be particularly tailored include sports, hobbies, scout troops, camping and outdoor activities, art, music, and travel, for example. Themes for digital director media could include humor, romance, family gatherings, baby showers, babies and children, and the like.

Other types of media could be used for providing or supporting digital director operation. Alternatives include magnetic media of various types, such as diskettes. Flash memory cards or other types of memory cards could also be employed as digital director media. Still other alternatives include communication of digital director instructions and images over wired or wireless connections, including the internet.

In effect, loading or downloading digital director instructions and images gives a "personality" to imaging apparatus 10 operation and editing, customizing how image and audio content is assembled to produce a presentation that is particularly suited to an event or theme. The example that follows shows one basic event of interest, a birthday party. Using the digital director, with the procedures described subsequently, an operator can film and produce a video presentation that is appropriately adapted for the age, sex, and interests of the subject.

Operating Sequence—Preparation to Customize the Digital Director

Figure 4:
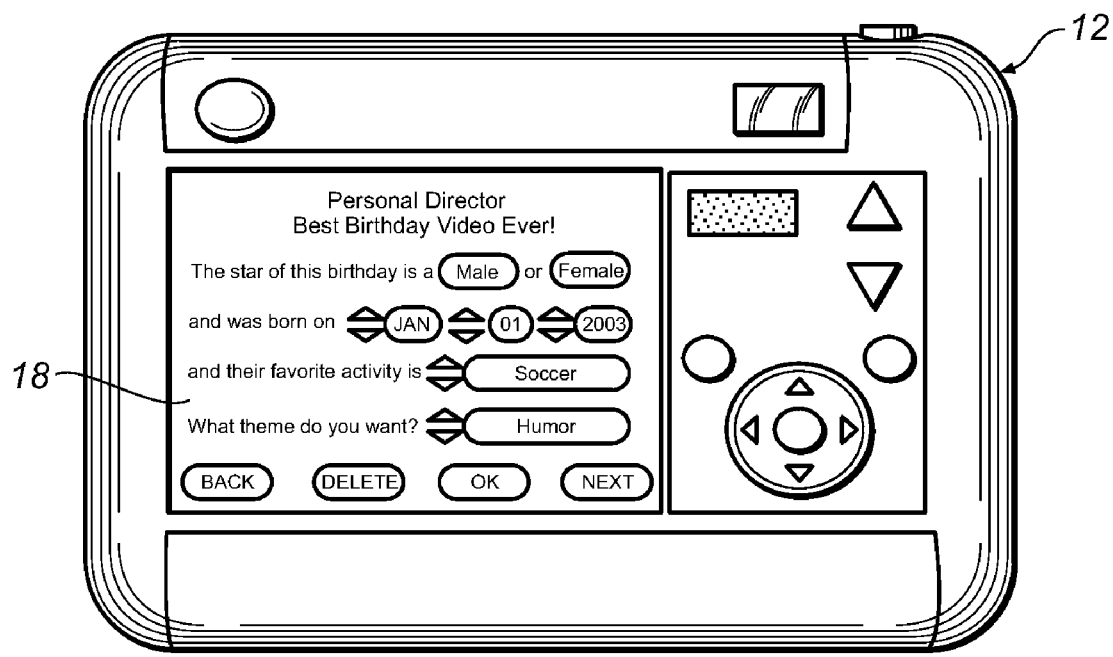
FIG. 4 is a plan view showing the appearance of the display of the camera for accepting preparatory information from the operator.

To operate the digital director, the consumer first loads digital director software into imaging apparatus 10. In the embodiment of FIG. 3, electronic storyboard software and supporting images and effects load from a DVD that acts as optical storage disk 42. As is shown in FIG. 3, the operator feeds optical storage disk 42 into imaging dock assembly 30 as a preparatory step to image capture. Digital director software on optical storage disk 42 then prompts the consumer to make some preliminary selections that more precisely identify the event or theme for an image capture session. By way of example, and not of limitation, digital director prompts suited to a birthday theme may prompt the operator to identify age, sex, name, and other information about the person whose birthday is being celebrated. Prompts may appear on touchscreen display 18 of camera 12, as is shown in the example of FIG. 4.

Figure 5A:
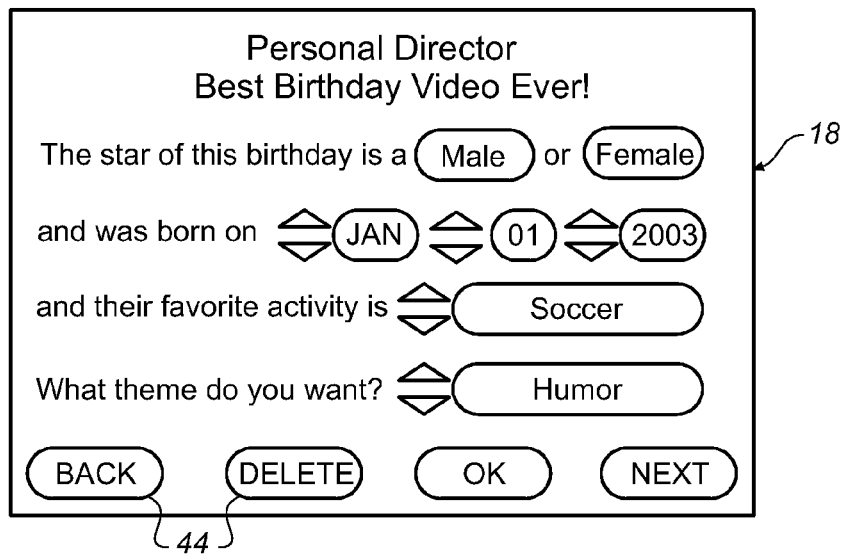
FIGS. 5a-5d are plan views of the camera display showing a first example sequence of prompts for setting up a customized event-based image capture sequence.
Figure 5B:
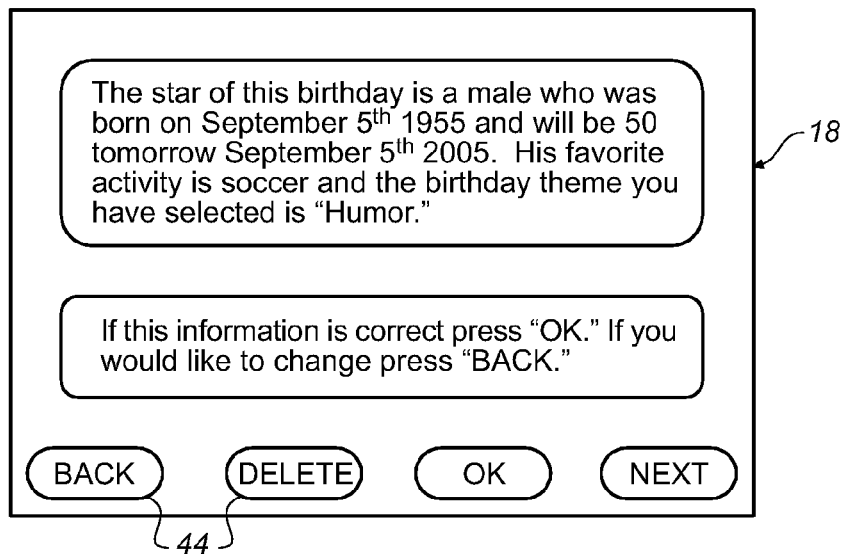
Figure 5C:
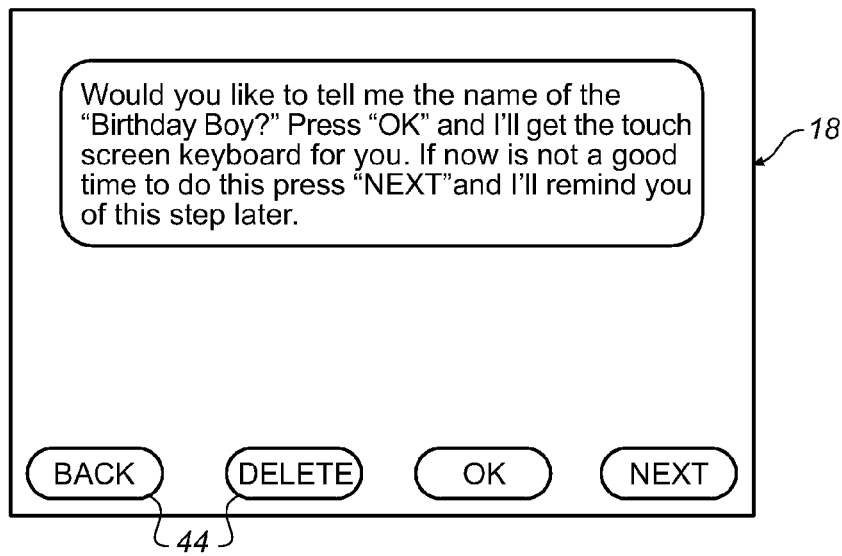
Figure 5D:
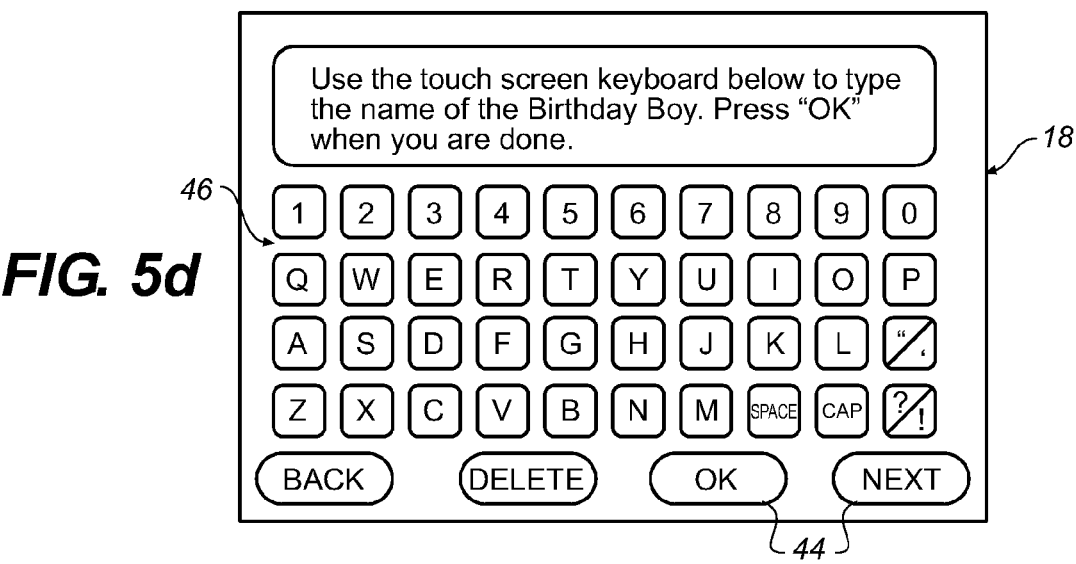

FIGS. 5a-5d show an example sequence with typical screen prompts that help to customize digital director operation, as is described subsequently. Touchscreen buttons 44 accept operator responses that help to tailor the sequence of operations that follow. An on-screen keyboard 46, as shown in FIG. 5d, can be used to enable text entry. Alternatively, if the camera is enabled with voice recognition capabilities, spoken words can be converted into text. Captured audio can also be used instead of text or to augment text.

Referring to FIG. 9a, there is shown, in conceptual form, an electronic storyboard 70, which is generated as a result of these initial preparation steps. Like its well-known equivalent in movie production, electronic storyboard 70 specifies an ordered arrangement of image sequences. This can include graphics 54 and title text 68 as well as planned segments 76, which are allotted for captured image sequences 64 when these are obtained. Transitions 66 are also provided between captured image sequences 64. These transitions may be fades, graphics, segues, or other scene transitions, using any of the techniques described in U.S. Pat. No. 6,292,219, listed above or other familiar transitional mechanisms between captured image sequences 64.

Electronic storyboard 70 as shown in FIG. 9a is highly conceptual. In practice, any number of methods could be used for arranging captured image sequences 64 beforehand. However, FIG. 9a shows the basic principles: a plan is generated for incorporating captured image sequences with pre-stored images and special effects loaded as part of the digital director data. In a simple embodiment, electronic storyboard 70 may be provided automatically, without the option to customize beforehand. However, in the more elaborate embodiment shown with reference to FIGS. 5a-5d, electronic storyboard 70 is customized, based on subject profile data entered by the operator.

Image sequences, as the term is used in the present application, could be either motion or still images. As is well known, still images, if produced as part of a motion picture presentation, are simply repeated in multiple frames. Additionally, still images may be presented in a pseudo motion manner such as that popularized by director Ken Burns in presentations such as "The Civil War," where the still image is slowly zoomed and panned to enhance its visual interest Operating Sequence—Operator Instructions from the Digital Director FIGS. 6a through 6o show an example sequence by which the digital director software guides the operator through individual image capture operations for obtaining image sequences that complete electronic storyboard 70.

Figure 6A:
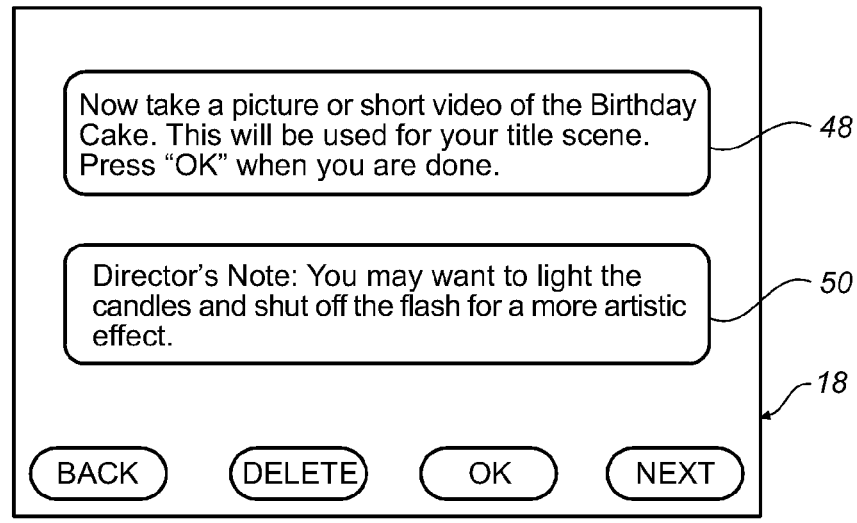
FIGS. 6a-6p are plan views showing a sequence of displays and prompts in one embodiment.
Figure 6B:
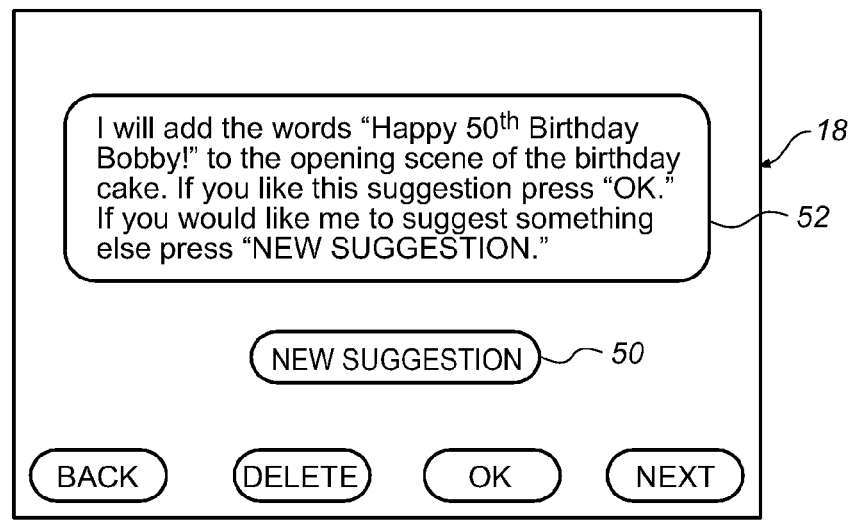
Figure 6C:
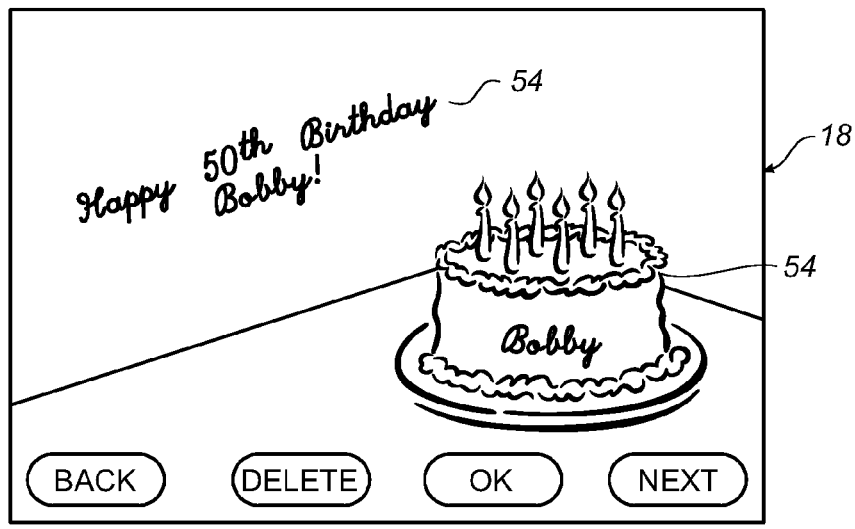
Figure 6D:
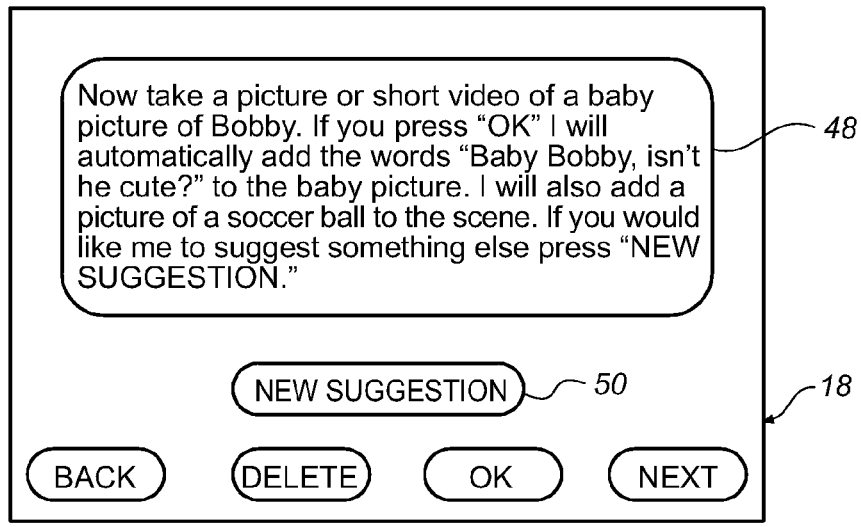
Figure 6E:
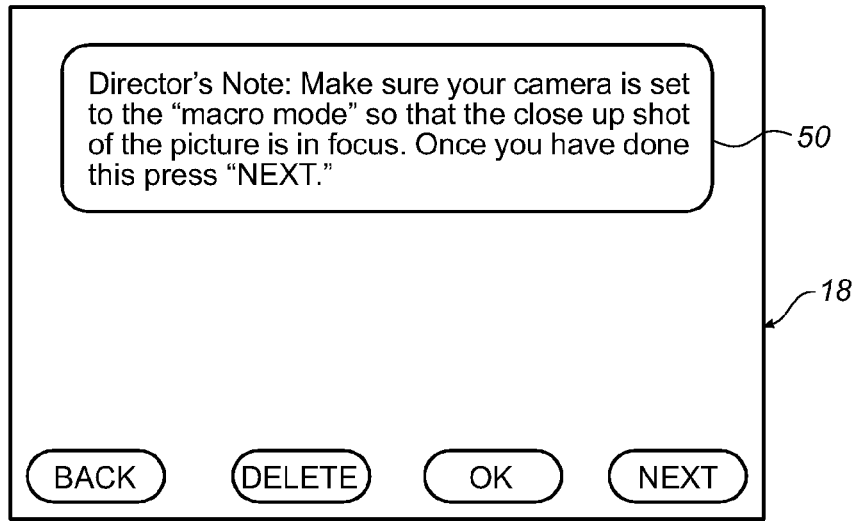
Figure 6F:
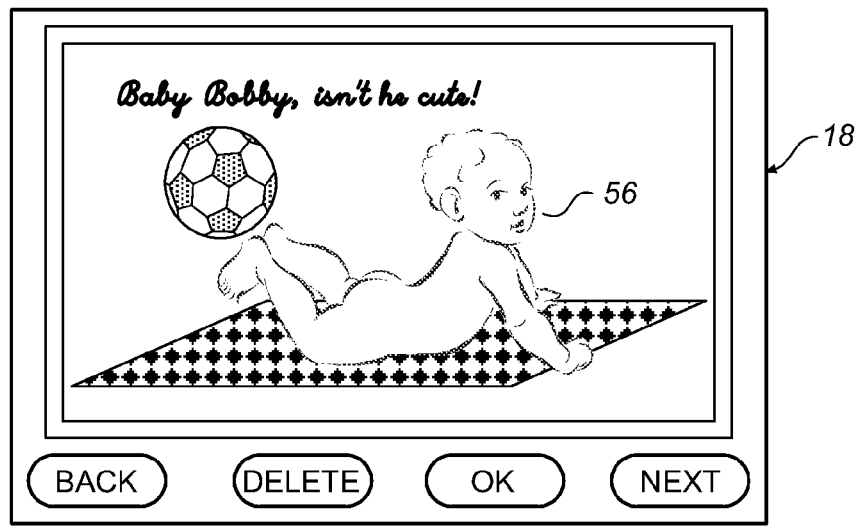
Figure 6G:
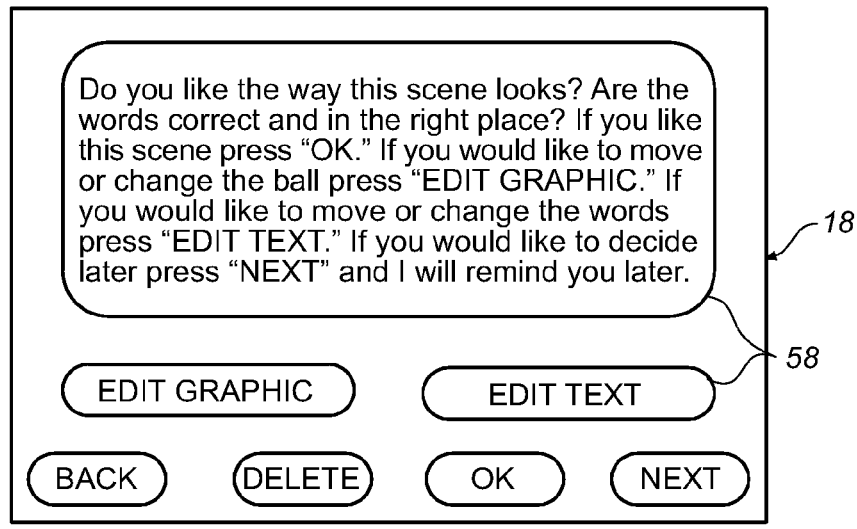

Referring to FIG. 6a, display 18 provides instructions 48 and optional hints 50 to the operator. These may include requests for different types of captured images as well as tips for use of the camera and for lighting and other environmental conditions. As shown in FIG. 6b, digital director may also provide messages 52 that give the operator various options for the image capture sequence. As shown in FIG. 6c, added graphics 54 may also be suggested and provided for operator approval. A still image 56 may be inserted as one type of image sequence if accepted by the operator, as is shown in FIG. 6f. Graphic editing options 58 may also be provided, as is shown in the example of FIG. 6g.

Figure 6H:
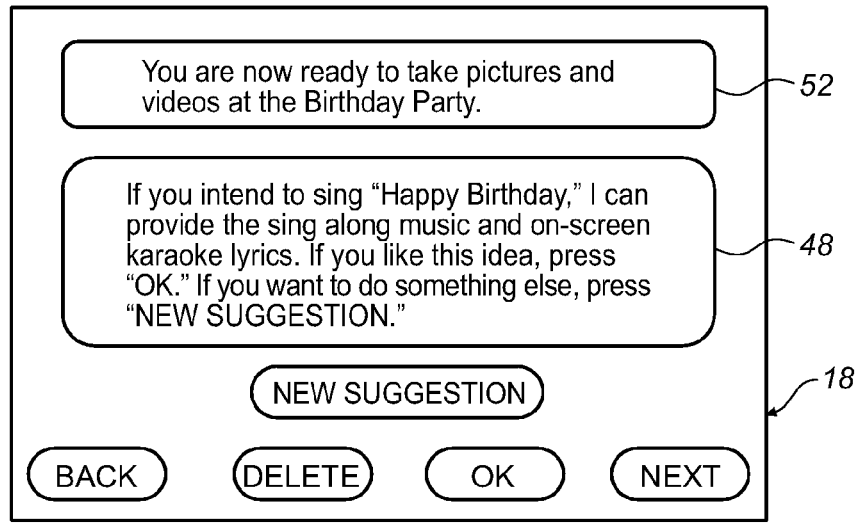
Figure 6I:
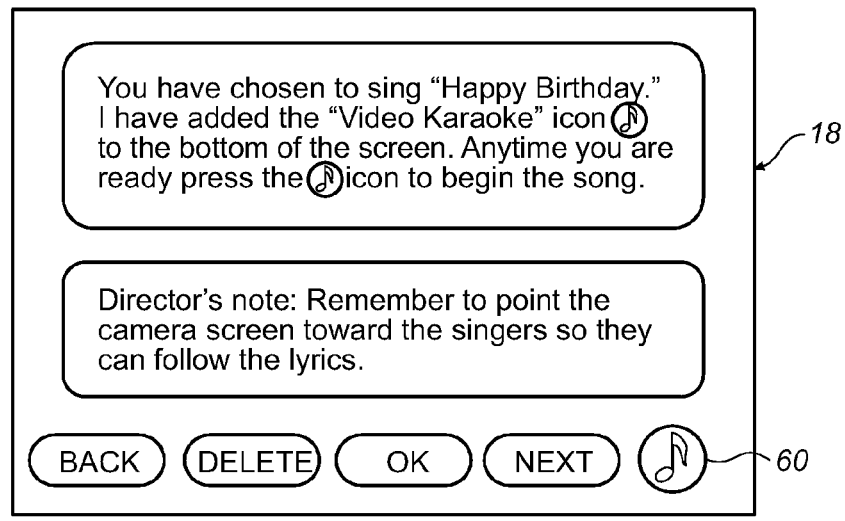
Figure 6J:
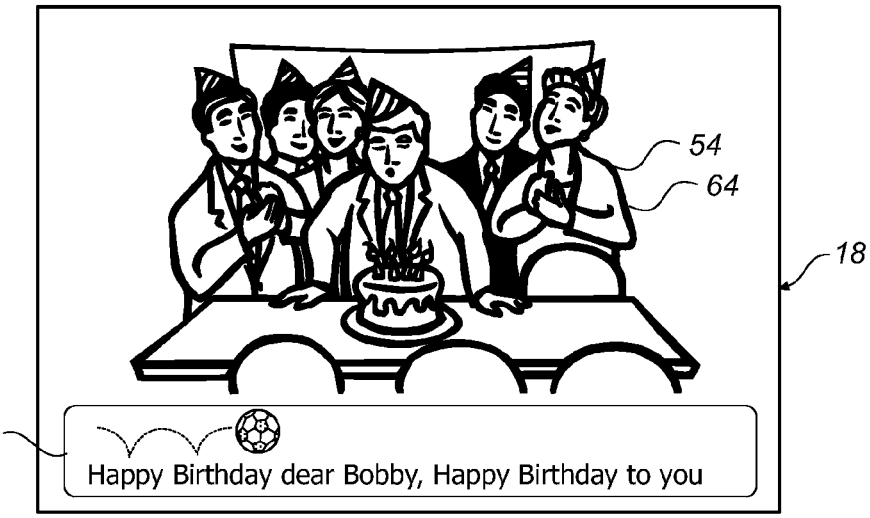
Figure 7:
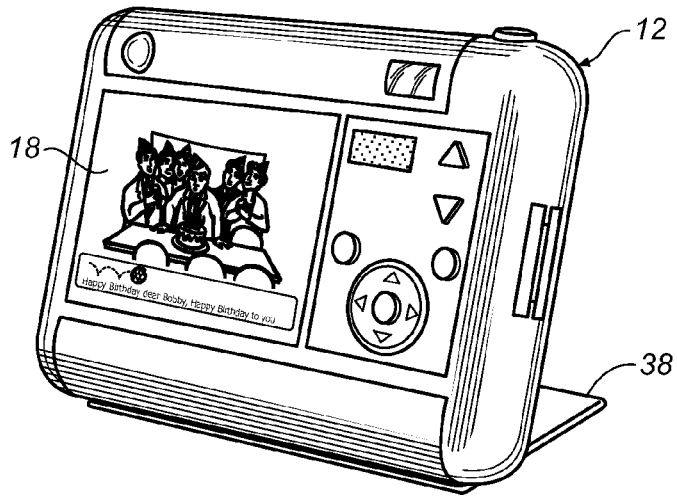
FIG. 7 is a perspective view of a camera providing a display and prompts, according to the present invention.

The display examples shown in FIGS. 6h, 6i, and 6j show a "video karaoke" sequence that can be inserted. Using this feature, an operator follows instructions 48, which may provide branching options, as shown in the example of FIG. 6h. As shown in FIG. 6i, a sequence prompt 60 allows the operator to indicate when to begin capture of the video karaoke sequence. At this point, for example, the operator may wish to set camera 12 on stand 38, as is shown in FIG. 7, and join in on the fun. Display 18 may then show the actual scene as a song or other sequence is performed or may simply display graphics 54, as shown in FIG. 6j. During the karaoke sequence, an animated prompt 62 may display to guide participants through the text in an enjoyable manner. The output of the camera may be connected to a television so that the text is more legible. The captured video may or may not be displayed during this sequence.

Figure 6K:
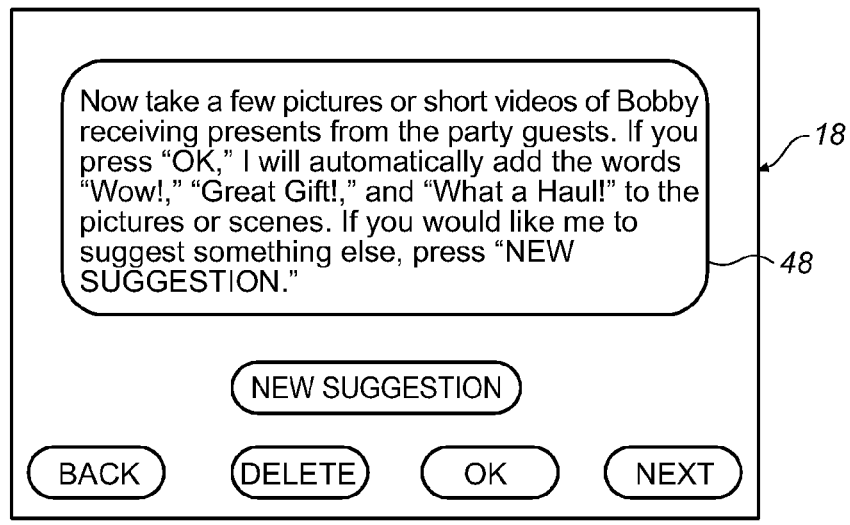
Figure 6L:
Figure 6M:
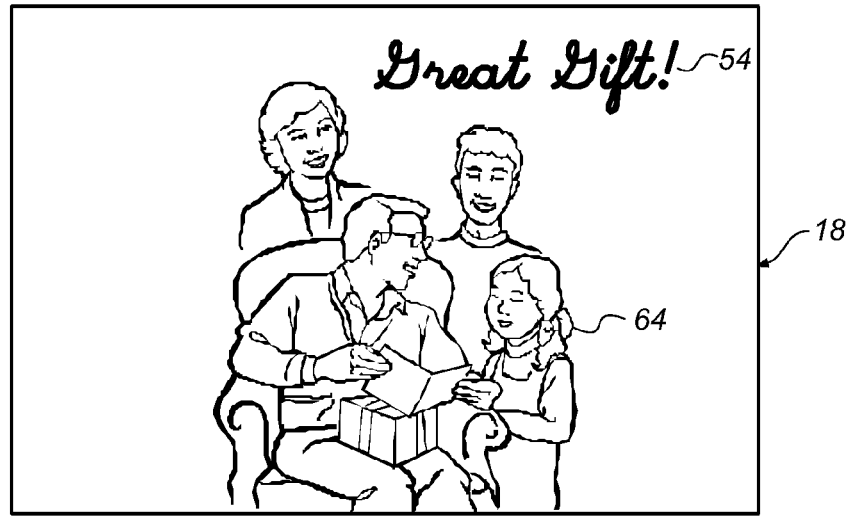
Figure 6N:
Figure 6O:
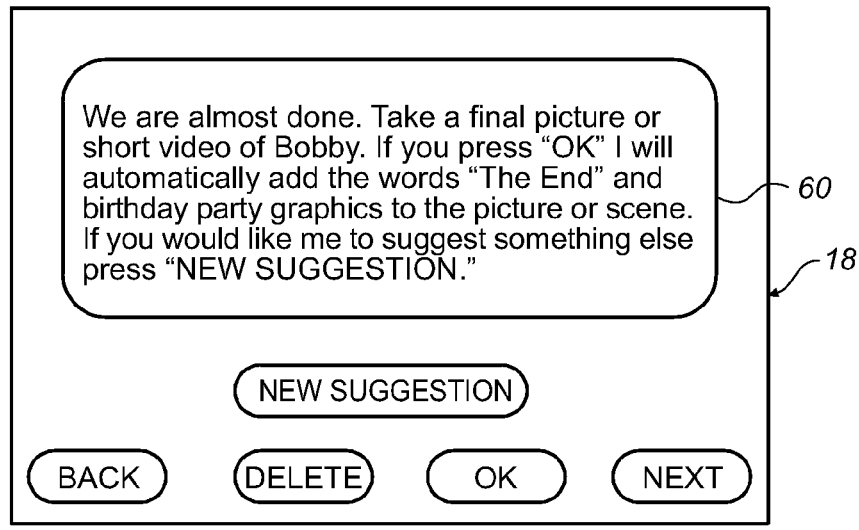
Figure 6P:
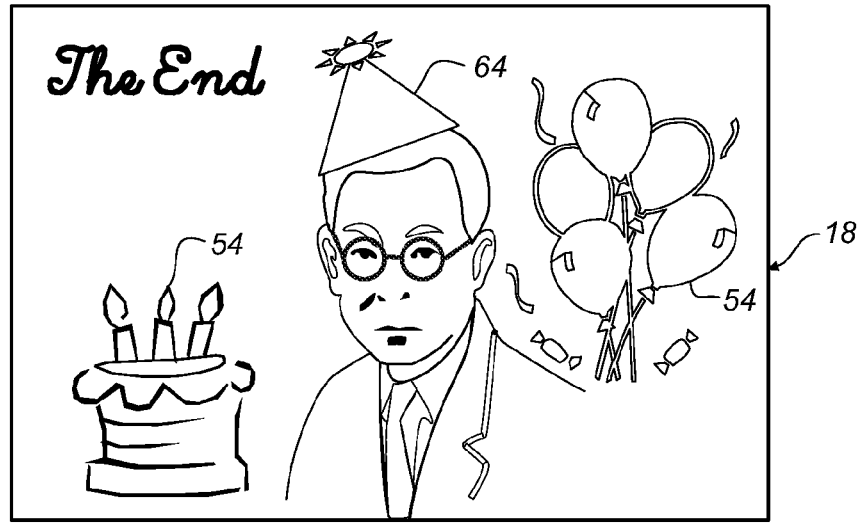

FIGS. 6l, 6m, and 6n show various text graphics 54 added to scene content as it is captured and displayed on display 18. This example sequence is then completed with graphics 54 added to final scene content, as is shown in FIG. 6p. To enhance the visual interest, it is preferred that the text graphics 54 move and/or change appearance as it is displayed, instead of being static. For example, in FIG. 6p, the text "The End" can slowly fade in, the candles on the cake can flicker, and the balloons can slowly spin, and then "pop" at the end of the scene.

Completing Electronic Storyboard 70

FIG. 9b shows the results of image capture and processing, in concept, according to instructions as shown in the example of FIGS. 6a-6p. With reference back to FIG. 9a, electronic storyboard 70 is effectively transformed into a presentation 72 with captured image sequences 64 arranged in the order specified by electronic storyboard 70. Of course, operator responses during image capture may change electronic storyboard 70 dynamically; however, electronic storyboard 70 as initially created provides at least some structure for the prompt sequence and operation of imaging apparatus 10. Note also that image sequences captured by the user were not necessarily captured in the order presented on electronic storyboard 70.

Figure 8:
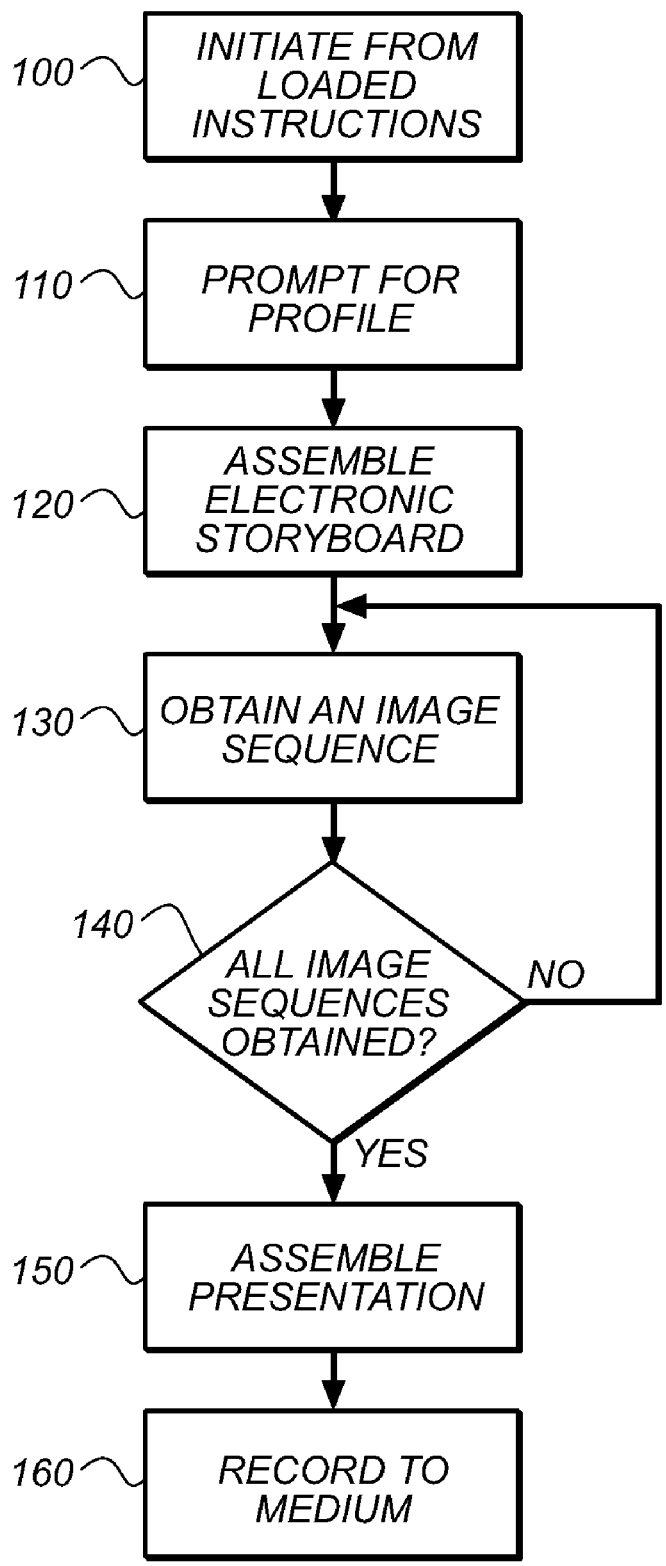
FIG. 8 is a flow chart showing a first example sequence of steps for obtaining images and assembling an electronic storyboard according to the present invention.

Referring to FIG. 8, a summary of steps carried out by control logic processing circuitry in imaging apparatus 10 for completing electronic storyboard 70 is shown. In an initiation step 100, the operator loads programmed instructions and, optionally, image content, and begins. In an optional prompt step 110, the operator is prompted for profile information on the subject to be filmed, as was shown in the example of FIG. 5a. In an assemble storyboard step 120, imaging apparatus 10 prepares electronic storyboard 70 or its equivalent. In an image capture step 130, the operator is prompted to film an image sequence, which may be a still or motion image, as is described above. A test step 140 determines if all needed image sequences for completing electronic storyboard 70 have been obtained and causes image capture step 130 to be repeated as necessary. Once this is true, an assembly step 150 processes the obtained image sequences and arranges them in the order assigned by electronic storyboard 70, forming presentation 72 thereby.

During the assembly step 150, transitions between image sequences can use segues supplied as part of the digital director software, as described commonly assigned U.S. Pat. No. 6,292,219 (Fredlund et al.), the disclosure of which is incorporated herein by reference. Appropriate segues can be automatically chosen by the digital director to match the theme and to match the image sequences which begin and end at this particular transition.

Alternatively, a partial completion of storyboard 70 may be used to for presentation 72, or a final editing step (not shown) can be provided for the user to approve and/or remove segments. A further embodiment allows the user to assign previously captured image sequences to storyboard 70, so that the user is not limited to use of image sequences captured under the guidance of digital director to create final presentation 72. Finally, in a recording step 160, imaging apparatus 10 writes presentation 72 onto a recording medium. In one embodiment, this is a DVD. This may be an unused, blank DVD or, optionally, the same DVD originally used to load programmed instructions in initiation step 100.

Note that in an alternative embodiment, a control logic processor for executing the pre-programmed instructions and for arranging the playback of the presentation from the plurality of the captured image sequences stored in said random-access electronic memory according to said operator responses may not be in the camera. This function may be executed downstream of imaging apparatus 10 in a writer or computer (not shown).

Special Effects

Numerous special effects can be employed for further customization of presentation 72. These include, for example, slow motion, accelerated motion, auto-rotoscope, programmable time-lapse, time-reversal, image mirroring, and geometric distortion. Special effects can be applied at the time of image sequence capture or during final processing in preparing presentation 72. These effects are provided as part of the digital director software and can be automatically used for particular sequences. For example, an sequence of the "birthday boy" blowing out the candles on his birthday cake can be shown in the slow-motion "forward" (e.g. normal) direction, and then shown in the slow-motion "backward" direction, so that it appears that the candles are magically re-lighted. Similarly, by using "time-reversal," gifts can be re-wrapped and cakes can be re-assembled from cut pieces.

Graphic templates may be provided for one or more image sequences, for both still and motion pictures. Templates may include decorative or thematic borders and could be populated with still or motion images using "drag and drop" or other suitable user interface techniques. A template could also allow display of multiple images at one time. Templates may also be used to create multiple still image formats for generating printed output, such as photographic quality prints, album pages, calendar pages, index prints, photo books, cards, invitations and the like, or for digital slide shows. Other graphic content, such as avatars and overlays, could also be used.

Auxiliary sound clips could also be added, including sound clips provided with digital director media. Using auxiliary sound clips, for example, laugh tracks, music, sound effects, and other audio content could be mixed in with, or replace, audio content obtained during filming.

As can be seen from the above description, the digital director takes advantage of the capabilities afforded by digital image capture and random-access storage of image sequences and allows effective use of imaging tools disclosed in both U.S. Pat. Nos. 6,292,219 and 5,477,264, while adding prompt/response sequences and automatic assembly of image sequences that both customize and simplify the image capture process. Digital director capability can be effectively used to guide a relatively unskilled operator through the sequence of steps necessary to produce a pleasing and effective theme- or event-based video presentation. The digital director frees the operator from timing and sequencing concerns when obtaining image sequences, allowing the operator to concentrate on one sequence at a time. By arranging the image content according to an electronic storyboard and adding transitional and special effects graphics element, the digital director helps to provide an amateur camera user with an output that has the advantages and appearance of being professionally edited. In some embodiments, the operator can immediately review the sequence that has just been captured along with any special effects, text graphics, etc. that will be used in the final presentation. If the final sequence is not visually pleasing, the operator can immediately recapture a new sequence while the subjects being photographed are still available.

Second Embodiment

Music Video Script

In a second embodiment, a music video is used as the script to enable the user to produce a compelling program. The digital video camera is provided with digital director programmed instructions in the form of an audio soundtrack (a popular song, for example) a video track (such as music video scenes, for example) and a control track that provides instructions for video frame compositing and pseudo-camera movements. The audio soundtrack is played back as new video sequences are captured, so that the filmed subjects can act in time to the music. The captured live video is then combined with the video track to produce a new video sequence that includes both live images and the music video scenes provided by the digital director.

In a preferred embodiment, the live images are captured with the subjects moving in front of a stationary background, allowing an alternate background to be added once the live images have been obtained. For this type of image processing, one or more initial images of background content only are first obtained and stored. This allows the background to be subsequently masked and replaced by a different moving background sequence provided by the video track, as described in commonly-assigned U.S. Pat. No. 5,914,748 (Parulski et al.), the disclosure of which is incorporated herein by reference.

Figure 10A:
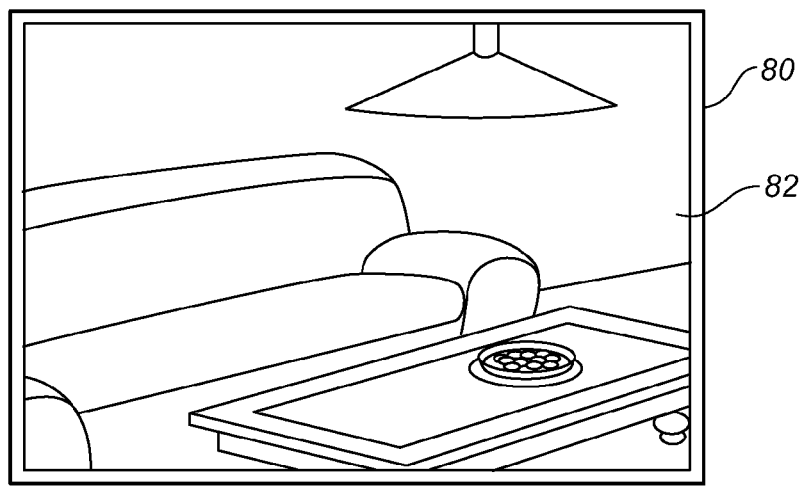
FIGS. 10a-10g are plan views showing images obtained and processed according to the present invention.
Figure 10B:
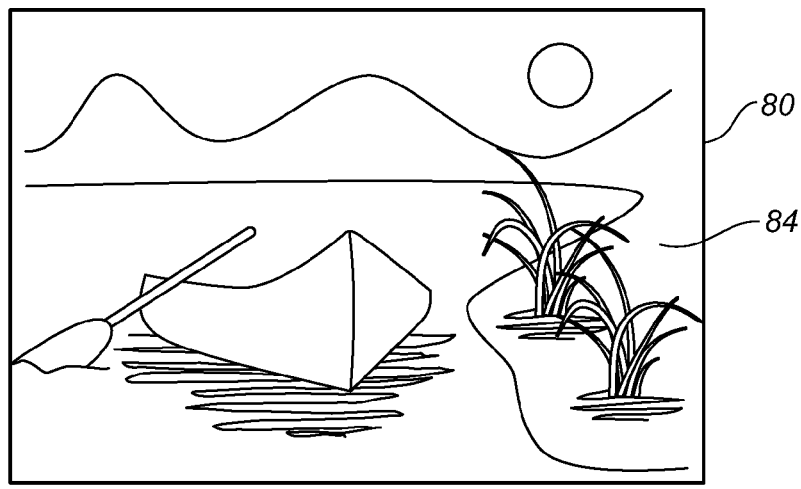
Figure 10C:
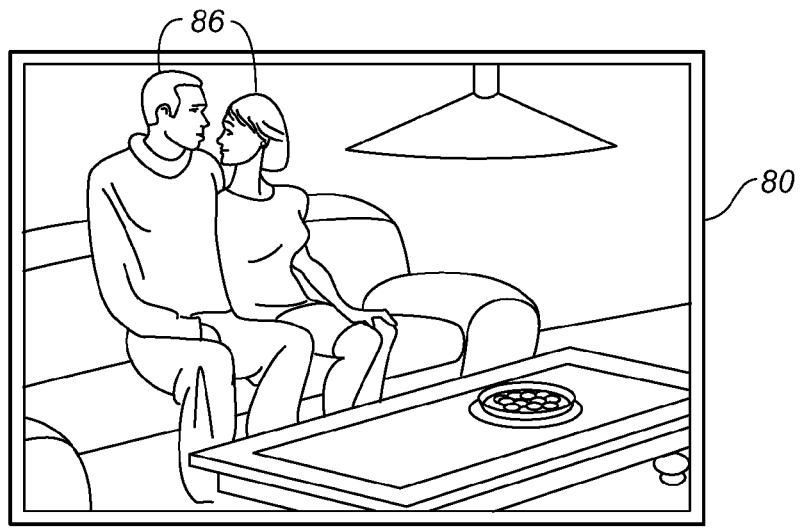
Figure 10D:
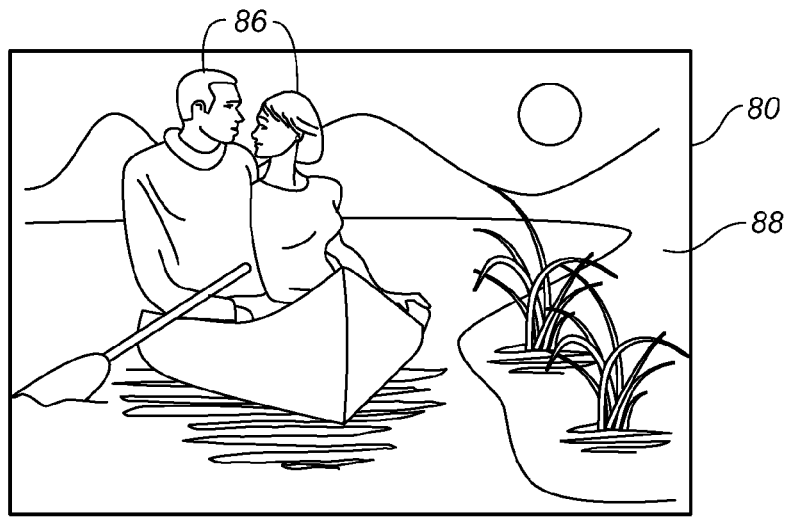
Figure 10E:
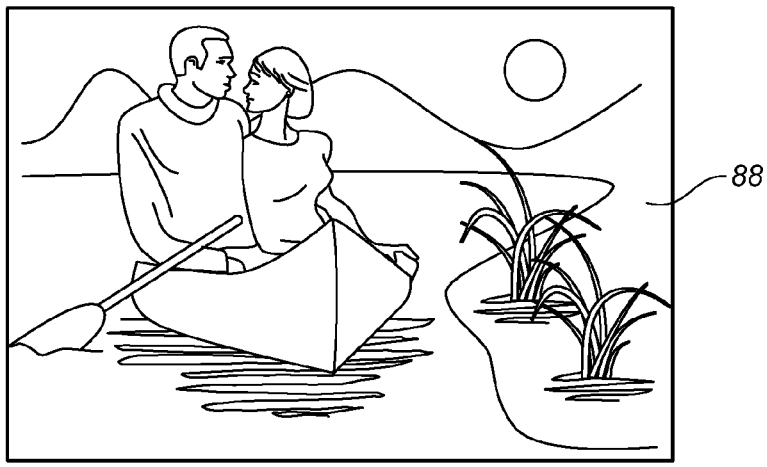
Figure 10F:
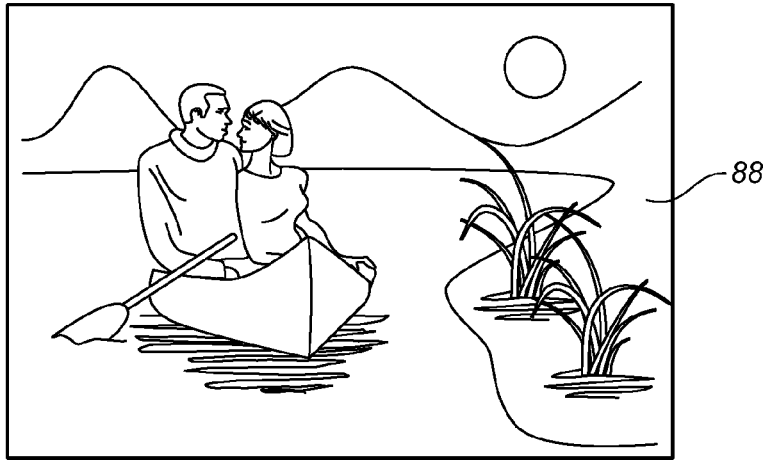
Figure 10G:
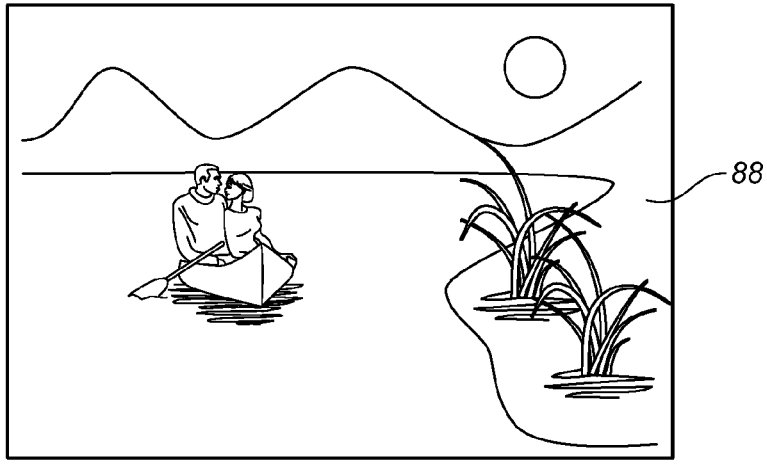

The basic example series of image frames shown in FIGS. 10a-10g show how compositing of image frames 80 can be performed. A background image 82 is first obtained from the camera 12 position as shown in FIG. 10a. A stored image 84, loaded for the digital director, provides the background desired for the edited music video sequence, as shown in FIG. 10b. As is shown in FIG. 10c, one or more subjects 86 are then captured, against the same background of FIG. 10a. Following capture of subjects 86, image capture and recording apparatus 14 (FIG. 1) then replaces background image 82 with stored image 84, with masking techniques applied to subjects 86, thereby forming a composited image 88, as is shown in FIG. 10d. Alternatively, a user captured image sequence can be used to replace background image 82. However, the final composite image 88 may not be as convincing FIGS. 10e, 10f, and 10g show a zoom sequence executed on composited image 88 by image capture and recording apparatus 14.

In a preferred embodiment, the control track provided by the digital director defines the way in which the foreground live image is composited into the background video track. The control track can include camera 12 control information that defines the camera 12 motion (such as zooming, panning, and rotation) of the background video track. This enables the same camera 12 motion to be digitally simulated in the live camera 12 image. For example, during a particular sequence, the background video can slowly pan to the left while zooming in. Using this technique, camera 12 itself can be stationary during the capture of the music video sequence, unchanged with respect to actual zoom position and other settings. The control track enables the digital video sequence captured by camera 12 to be digitally manipulated within image capture and processing apparatus 14 itself, thereby producing an apparent pan and zoom sequence. Thus, without requiring sophisticated camera 12 controls or capture techniques, the digital director enables a visually interesting and realistic sequence to be produced.

Figure 11:
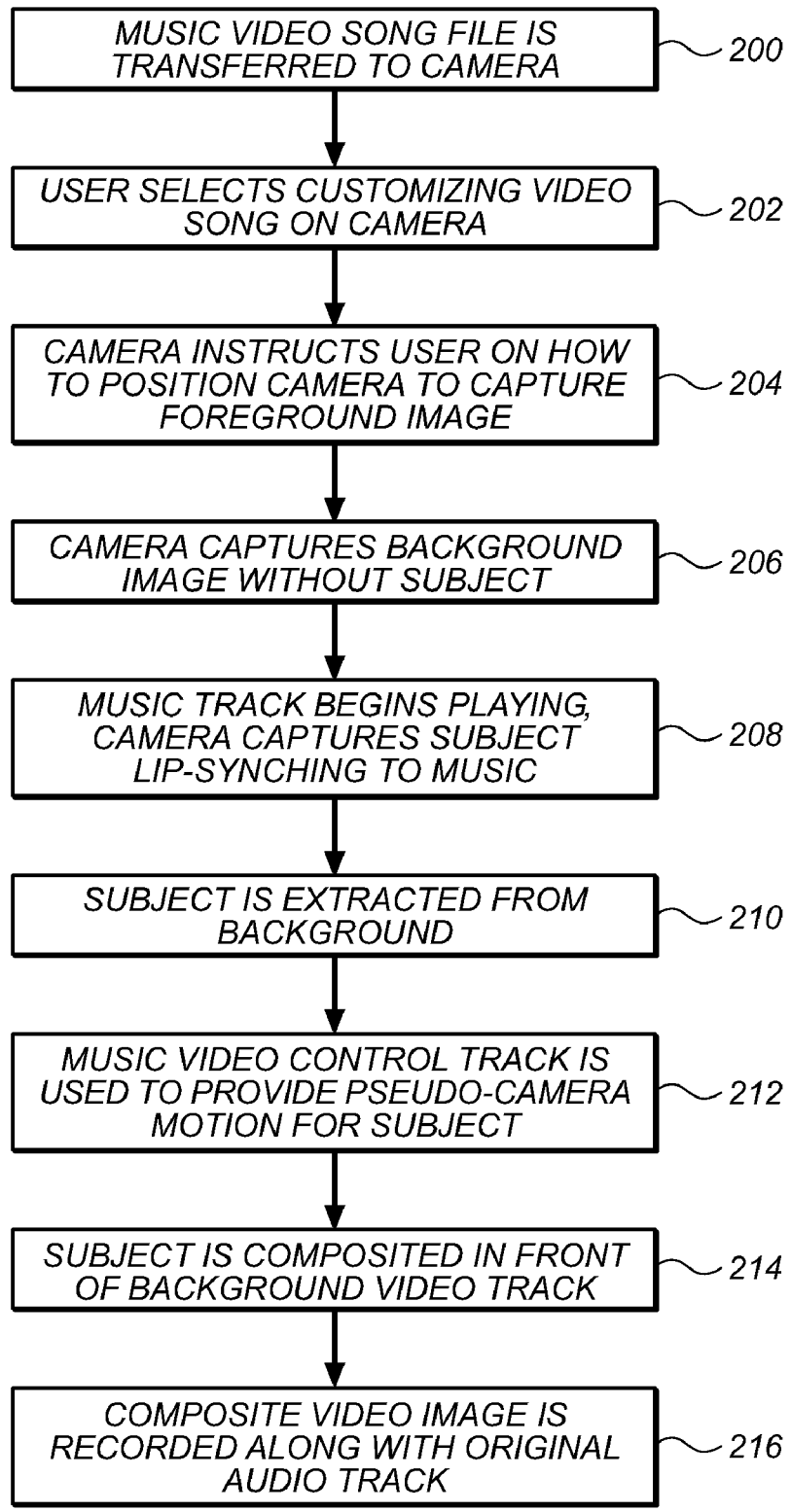
FIG. 11 is a flow chart showing an example sequence of steps for capturing a music video based scripted program according to the present invention.

Referring to the flow chart of FIG. 11 and to the series of display prompts in FIGS. 12a-12e, there is shown an example sequence of steps for capturing a music video based scripted program according to this embodiment of the present invention. A transfer step 200, initiated by a user selection for example, loads music audio to image capture and recording apparatus 14. A selection step 202, described in more detail subsequently, specifies a particular tune for playback during image capture. The camera 12 operator is provided with the procedures for setup in a setup instruction step 204. Camera 12 then captures background image 82 in a background capture step 206. With subjects 86 in place, a content capture step 208 is executed, obtaining images of subjects 86 singing to the music. Following capture of this image content, image capture and recording apparatus 14 performs a number of processing steps. Each subject 86 is extracted from the actual background image during a background extraction step 210. Panning, zoom, and other camera 12 effects are simulated in a simulation step 212. Each subject 86 is then combined with stored image 84 in a compositing step 214. Audio is added in a mixing step 216. The compositing step can include interspersing various background segments, provided as part of the digital director software, with the composite image segments. For the example shown in FIG. 10a-10g, these background segments can show close-ups of the oars dipping in the water, the sun reflecting off the water, fish swimming in the water, etc. The final video production can then be recorded onto a suitable video storage medium, including a DVD provided with digital director software and content, for example.

Figure 12D:
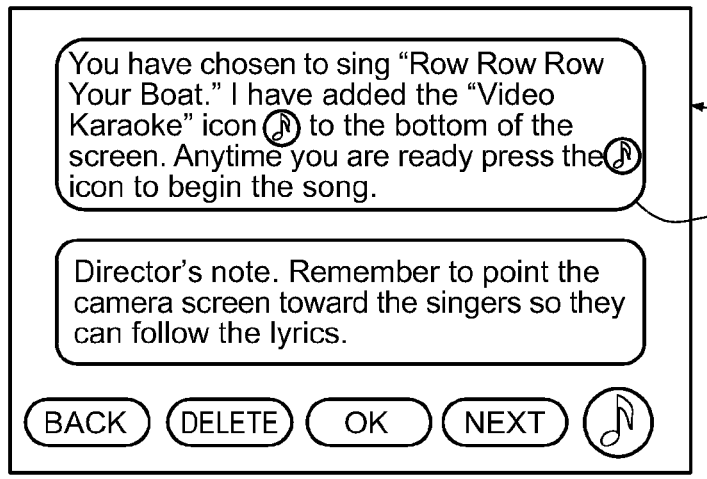
FIGS. 12a-12e are plan views of the camera display showing a second example sequence of prompts for capturing a music video based scripted program.
Figure 12E:
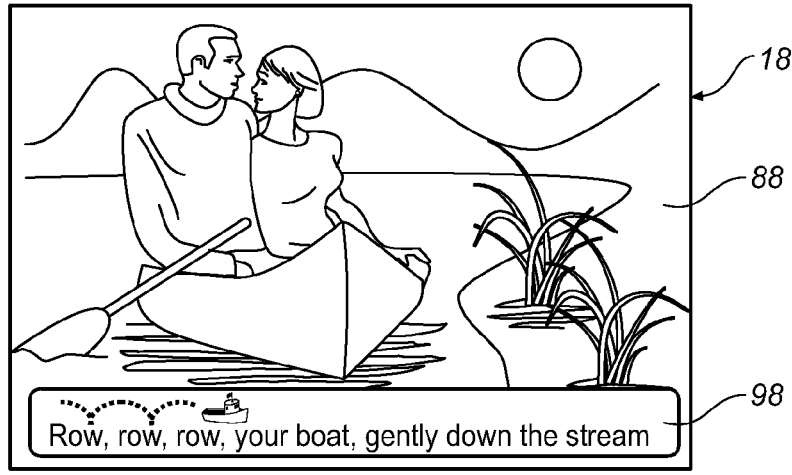
Figure 12A:
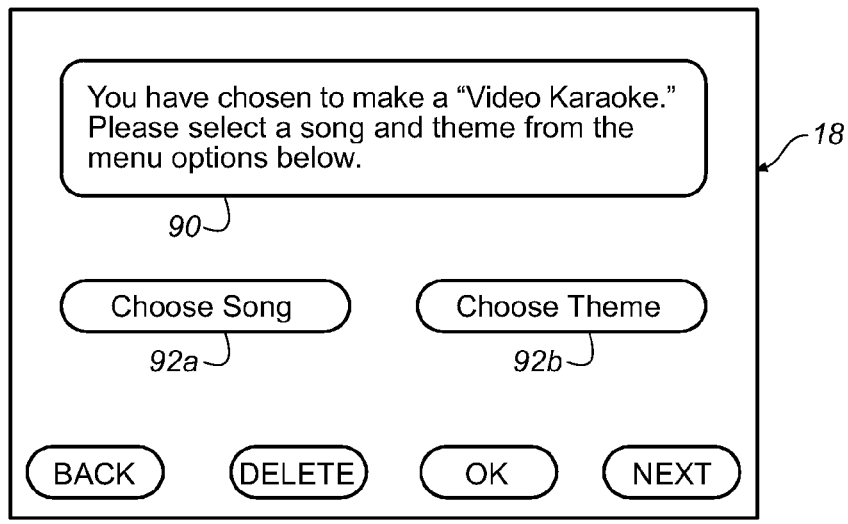
Figure 12B:
Figure 12C:
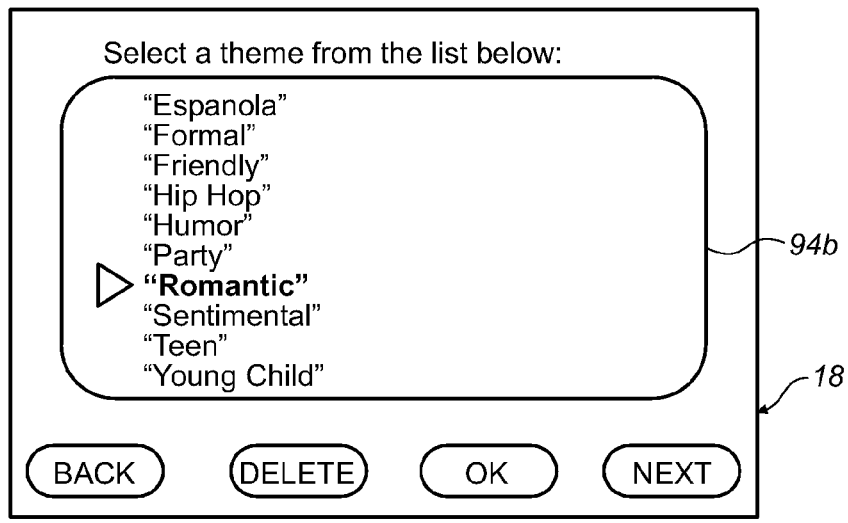

Display 18 of camera 12 provides prompts and allows operator selections to support the image capture portions of the sequence described with reference to FIG. 11. FIG. 12a shows a selection prompt 90 for operator specification of song and overall theme, with a song selection button 92a for song selection and a theme selection button 92b for theme selection. FIG. 12b shows a song selection menu 94a that displays when the operator presses song selection button 92a in FIG. 12a. FIG. 12c shows a theme selection menu 94b that displays when the operator presses theme selection button 92b in FIG. 12a. FIG. 12d shows an initiation prompt 96 for beginning the music video sequence with setup instruction step 204 and following steps of FIG. 11. FIG. 12e shows a lyrics prompt 98 that appears on display 18 during capture of the music video. Composited image 88 might be displayed dynamically, as is shown in FIG. 12*e*. Alternately, display 18 may simply show subjects 86 as they are being captured, before image frame composition or display 18 may be limited to display of lyrics alone.

Figure 13:
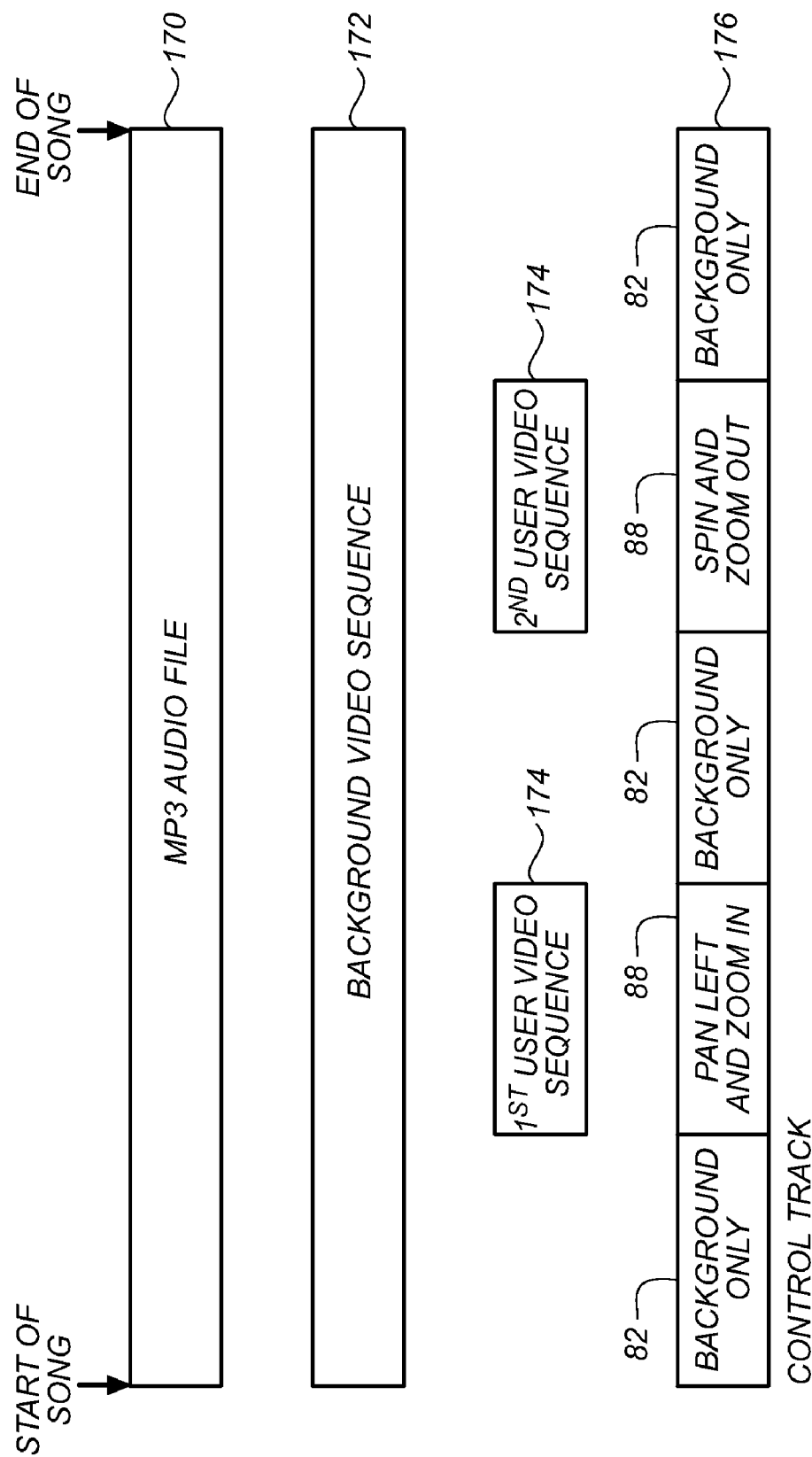
FIG. 13 is a chart showing the relative timing of various components of audio and video components that are combined using the method of the present invention.

The timing chart of FIG. 13 shows the temporal relationship of stored audio, shown as an audio file 170 in MP3 format, for example, with a stored background video sequence 172 and user video sequences 174. Based on a digital storyboard technique, the digital director generates a composited video sequence 176 that has segments showing background image segments 82 interspersed with composited image segments 88.

The result is a "personalized" music video, produced by the user and featuring a selected song, with one or more subjects 86 suitably featured as the "stars." The live scene is captured as the actors perform in accordance with the song, and the composited video images are stored in synchronization with the song.

Third Embodiment

Humorous or Topical Scripted Sequence

In a third embodiment, a random playback humorous scripted program or other topical sequence is produced. In this embodiment, the digital director provides instructions to the user to capture images of a number of participants. The participants are asked to answer a group of questions or to perform a group of actions in response to visual or audio prompts from camera 12 or, more generally, from image capture and recording apparatus 14. The image of the participant is then captured while answering the questions and performing the actions as instructed. Each participant response segment is then available for playback by the digital director, controlled by a script.

Figure 14A:
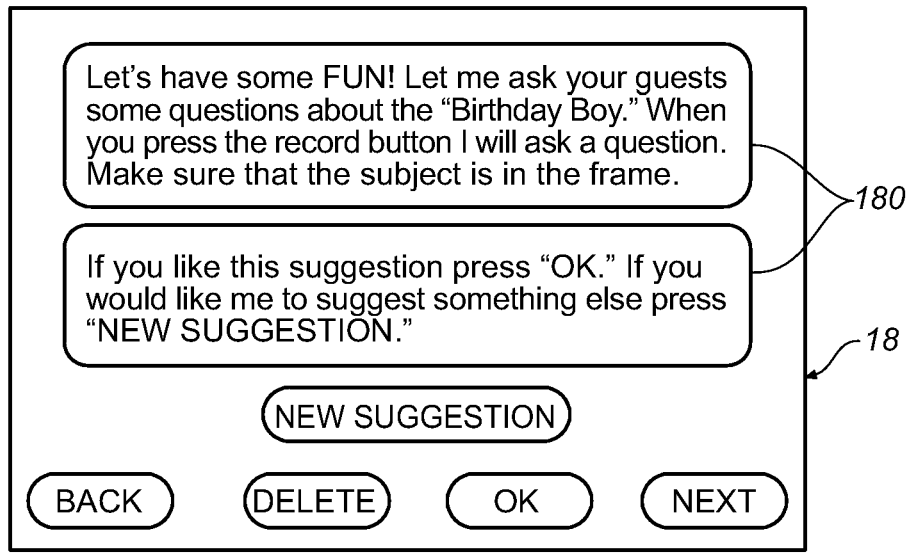
FIGS. 14a-14c are plan views of the camera display showing an example sequence for a humorous scripted presentation according to the present invention.
Figure 14B:
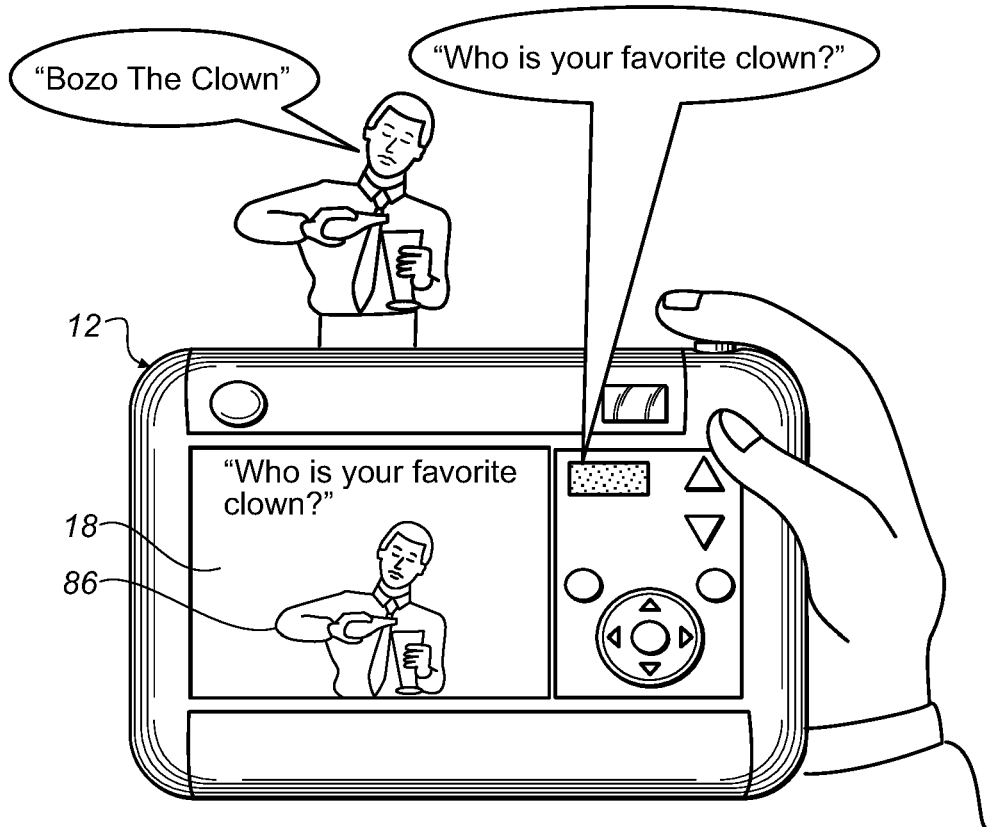
Figure 14C:
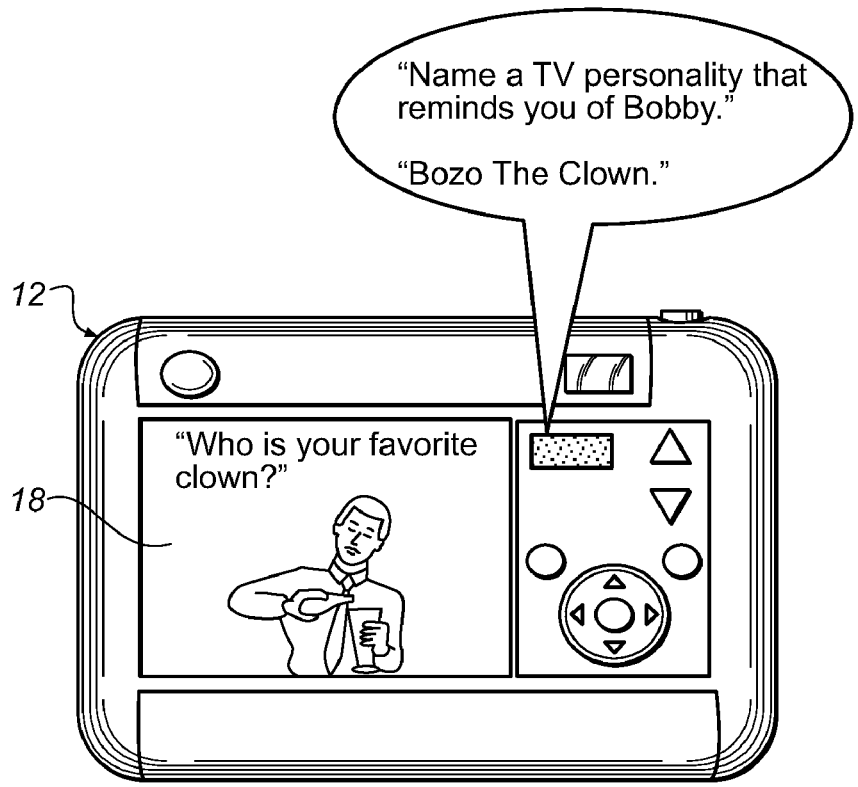
Figure 15A:
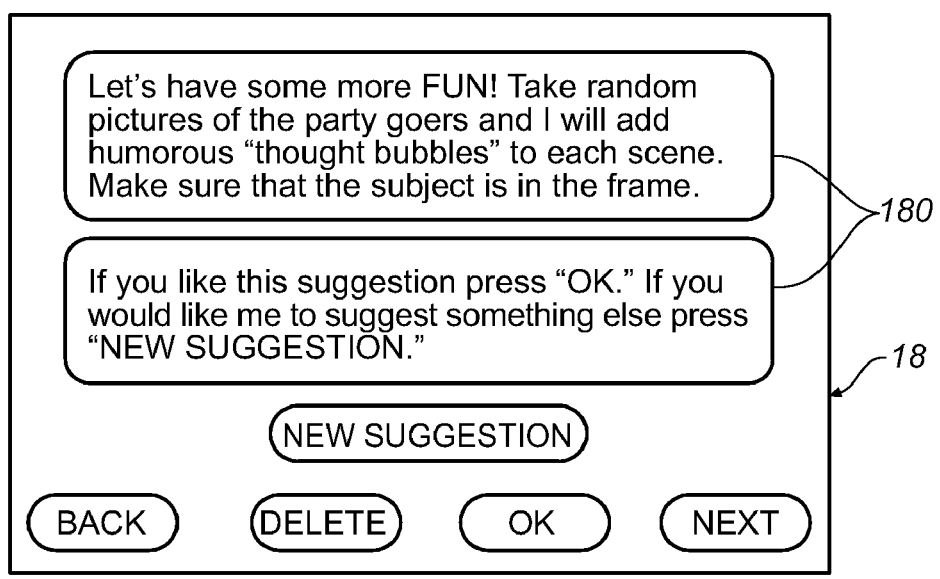
FIGS. 15a-15d are plan views of the camera display showing an example sequence for an alternate humorous scripted presentation according to the present invention.
Figure 15B:
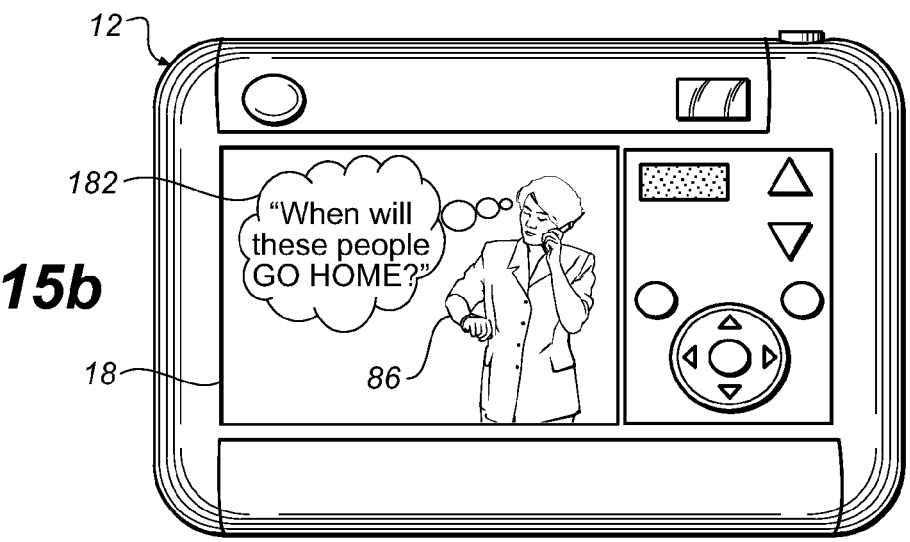
Figure 15C:
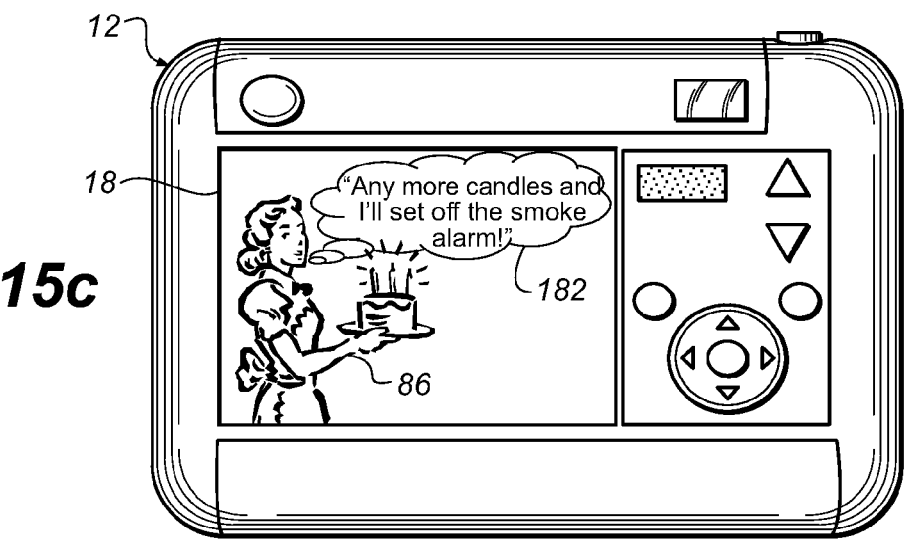
Figure 15D:
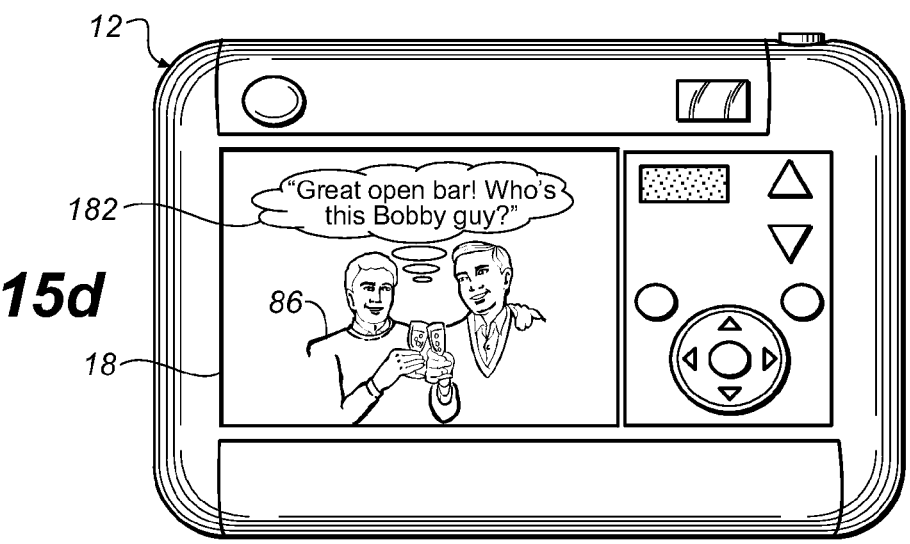

The display sequence of FIGS. 14*a*-14*c* shows a simple example of a humorous sequence. As shown in FIG. 14*a*, one or more suggestion prompts 180 may be posted to display 18, suggesting a scripted sequence. The operator can accept the displayed sequence or select a different sequence. A series of prompts and instructions follows, as has been described with reference to the embodiments described above. In FIG. 14*b*, subject 86 is posed a question or directed to execute an action. The response of subject 86 is recorded for playback, under control of the script that is selected. For example, in FIG. 14*c*, video playback appears on display 18 of camera 12 itself. The context of the original question may be changed as shown, for example, for humorous effect. Example questions can elicit, for example, names of favorite foods, drinks, sports teams, activities, historical facts, and the like, for example. Prompted actions may include facial distortions, for example. Captured segments can be played back with interspersed narration. Special effects could be used, such as replay in the form of a news program, old movie, news reel, and the like, for example.

FIGS. 15*a*-15*d* show another example using a humorous scripted sequence. After an affirmative response to suggestion prompts 180 in FIG. 15*a*, images of various subjects 86 are captured and graphics added during image compositing, such as thought bubbles 182 shown in FIGS. 15*b*, 15*c*, and 15*d*, for example. These thought bubbles can be static text, or can be transparent graphic overlays that slowly become more visible.

Numerous other approaches could be used for execution of a script using the digital director. Editing, randomization, repetition, action reversal or "rewinding," and similar effects can be utilized to generate a suitable, compelling story line. More complex scripts could be employed, involving several subjects 86 in different scenes of a story, such as a fairy tale, for example. The digital director utility could be used, for example, to generate a scripted tribute or greeting card, for example. Video sequences obtained using the digital director could be stored on various types of storage media, printed, and transferred to other display apparatus, for example.

The digital director software can be provided as a computer program product. A computer program product can include one or more storage medium, for example; magnetic storage media such as magnetic disk (such as a floppy disk) or magnetic tape; optical storage media such as optical disk, optical tape, or machine readable bar code; solid-state electronic storage devices such as random access memory (RAM), or read-only memory (ROM), or obtained via a communications link such as connection to a website via the Internet; or any other physical device or media employed to store a computer program having instructions for practicing a method according to the present invention.

The invention has been described in detail with particular reference to certain preferred embodiments thereof, but it will be understood that variations and modifications can be effected within the scope of the invention as described above, and as noted in the appended claims, by a person of ordinary skill in the art without departing from the scope of the invention. For example, imaging apparatus 10 may have any number of different arrangements of the basic components necessary for implementing digital director functions. Read and write capability could be executed using a number of different media types and wired or wireless communication mechanisms.

Thus, what is provided is an apparatus and method for enhancing image output from an electronic imaging device, using real-time instructions and scripted special effects.

PARTS LIST 10 imaging apparatus
12 camera
14 image capture and recording apparatus
16 RAM
18 display
20 control logic processor
22 interface circuit
24 input interface section
26 output interface section
28 audio input or playback circuitry
30 imaging dock assembly
32 printer
34 removable storage device
36 operator interface panel
38 stand
40 CD/DVD port
42 optical storage disk
44 touchscreen buttons
46 keyboard
48 instructions
50 hints
52 messages
54 graphics
56 still image
58 graphic editing options
60 sequence prompt
62 animated prompt
64 captured image sequence 66 transition
68 title text
70 electronic storyboard
72 presentation
76 planned segment
80 image frame
82 background image
84 stored image
86 subject
88 composited image
90 selection prompt
92a song selection button
92b theme selection button
94a song selection menu
94b theme selection menu
96 initiation prompt
98 lyrics prompt
100 initiation step
110 prompt step
120 assemble storyboard step
130 image capture step
140 test step
150 assembly step
160 recording step
170 audio file
172 stored background video sequence
174 user video sequence
176 composited video sequence
180 suggestion prompt
182 thought bubble
200 transfer step
202 selection step
204 setup instruction step
206 background capture step
208 content capture step
210 background extraction step
212 simulation step
214 compositing step
216 mixing step

The invention claimed is:

1. A digital video camera for producing composite motion video frames, comprising:
an image sensor for capturing user-captured motion video frames which do not include camera motion;
a processor for processing the user-captured motion video frames to produce the composite motion video frames,
a memory for storing pre-stored background motion video frames and control information which defines the camera motion of the background video frames, wherein the pre-stored motion video frames and the control information were stored prior to capturing the user-captured motion video frames; and
the processor responsive to the user-captured video motion frames, the control information and the pre-stored motion video frames to automatically process the user-captured motion video frames to produce processed user-captured motion video frames having digitally simulated camera motion and to produce the composite motion video frames by combining the processed user-captured motion video frames and the pre-stored motion video frames so that the composite motion video frames include subject content from the user-captured motion video frames and background content from the pre-stored motion video frames.

2. The digital video camera according to claim 1 wherein the simulated camera motion provides an apparent pan and zoom effect.

3. The digital video camera according to claim 1 wherein the simulated camera motion provides camera rotation.

4. The digital video camera according to claim 1 wherein the control information further include instructions to enable the processor to process the user-captured motion video frames to provide time-reversal.

5. The digital video camera according to claim 1 wherein the control information further include instructions to enable the processor to process the user-captured motion video frames to provide slow motion image frames.

6. The digital video camera according to claim 1 wherein the control information further include instructions to enable the processor to process the user-captured motion video frames to provide accelerated motion image frames.

7. The digital video camera according to claim 1 wherein the control information further include instructions to enable the processor to process the user-captured motion video frames to provide slow-motion forward frames followed by slow-motion time-reversal frames.

8. The digital video camera according to claim 1 wherein the control information further include instructions to enable the processor to process the user-captured motion-video frames to provide special effects including auto-rotoscope, image mirroring, or geometric distortions.

9. The digital video camera according to claim 1 wherein the memory stores a plurality of presentation themes that can be selected using an operator interface, each presentation theme having at least one associated pre-stored motion video frames.

10. The digital video camera according to claim 9, wherein the operator interface is a touchscreen.

11. The digital video camera according to claim 1, wherein the camera includes an integrated stand.

12. The digital video camera according to claim 1, further including a wireless communication mechanism for receiving the pre-stored motion-video frames.

13. The digital video camera according to claim 1, wherein the pre-stored motion video frames are event or theme based.

14. The digital video camera according to claim 13, wherein the control information includes at least one prompt for the user to provide selections that identify the event or theme.

15. The digital video camera according to claim 1, wherein the control information further includes prompting the user with suggestions for capturing the motion-video frames.

* * * * *